United States Patent [19]

Fukai et al.

[11] Patent Number: 5,326,179
[45] Date of Patent: Jul. 5, 1994

[54] APPARATUS FOR PRODUCING AN INFORMATION RECORDING CARD

[75] Inventors: Sigeru Fukai; Michio Shinozaki; Toshimasa Ishii; Kunio Omura; Hidetomo Sasaki; Ken Nishimura; Nobuaki Honma; Hiroyuki Kuroki; Tomoyuki Marugame, all of Tokyo, Japan

[73] Assignee: Toppan Insatsu Kabushiki Kaisha, Tokyo, Japan

[21] Appl. No.: 678,328
[22] PCT Filed: May 21, 1990
[86] PCT No.: PCT/JP90/00643
 § 371 Date: May 2, 1991
 § 102(e) Date: May 2, 1991
[87] PCT Pub. No.: WO91/00183
 PCT Pub. Date: Jan. 10, 1991

[30] Foreign Application Priority Data

| Jul. 4, 1989 | [JP] | Japan | 1-78913[U] |
| Aug. 17, 1989 | [JP] | Japan | 1-210729 |
| Sep. 29, 1989 | [JP] | Japan | 1-255835 |
| Sep. 29, 1989 | [JP] | Japan | 1-255836 |
| Oct. 31, 1989 | [JP] | Japan | 1-127388[U] |
| Oct. 31, 1989 | [JP] | Japan | 1-283688 |
| Mar. 30, 1990 | [JP] | Japan | 2-86711 |
| Mar. 31, 1990 | [JP] | Japan | 2-34634[U] |
| Mar. 31, 1990 | [JP] | Japan | 2-34636[U] |

[51] Int. Cl.⁵ .............................. B41J 2/325
[52] U.S. Cl. ........................ 400/120; 15/100
[58] Field of Search ........ 400/120, 701, 702, 234; 101/425; 15/100, 102, 256.5, 256.51, 256.52, 319; 74/89.15, 424.8, 440, 441; 346/76 PH, 139 D

[56] References Cited

U.S. PATENT DOCUMENTS

| 3,974,709 | 8/1976 | Janson et al. | 74/89.15 |
| 3,977,262 | 8/1976 | Randolph | 400/328 |
| 4,050,568 | 9/1977 | Davies et al. | 346/139 D |
| 4,394,092 | 7/1983 | Osmera et al. | 400/120 |
| 4,505,605 | 3/1985 | Hasegawa et al. | 400/208 |
| 4,542,387 | 9/1985 | Nagashima et al. | 400/120 |
| 4,755,069 | 7/1988 | LaManna et al. | 400/130 |
| 4,867,827 | 9/1989 | Lesieur | 101/32 |
| 4,969,760 | 11/1990 | LaManna et al. | 400/134 |
| 5,037,216 | 8/1991 | Nubson et al. | 400/120 |
| 5,080,512 | 1/1992 | Schofield et al. | 400/120 |

FOREIGN PATENT DOCUMENTS

| 50-26119 | 8/1975 | Japan . | |
| 52-114334 | 9/1977 | Japan . | |
| 52-127735 | 9/1977 | Japan . | |
| 55-39351 | 3/1980 | Japan . | |
| 56-135083 | 10/1981 | Japan . | |
| 57-108973 | 7/1982 | Japan . | |
| 58-59868 | 4/1983 | Japan . | |
| 58-131081 | 8/1983 | Japan . | |
| 58-200376 | 11/1983 | Japan . | |
| 60-34662 | 3/1985 | Japan . | |
| 60-44364 | 3/1985 | Japan . | |
| 280970 | 12/1986 | Japan | 400/82 |
| 286178 | 12/1986 | Japan | 400/82 |
| 61-292263 | 12/1986 | Japan . | |
| 62-98087 | 6/1987 | Japan . | |
| 62-100559 | 6/1987 | Japan . | |
| 67165 | 3/1988 | Japan | 400/82 |
| 63-183663 | 7/1988 | Japan . | |
| 1-17720 | 1/1989 | Japan . | |
| 1-43885 | 2/1989 | Japan . | |
| 53877 | 3/1989 | Japan | 400/120 |
| 1-158589 | 6/1989 | Japan . | |

Primary Examiner—David A. Wiecking
Attorney, Agent, or Firm—Browdy and Neimark

[57] ABSTRACT

The card producing apparatus which records magnetic data or printed data on many cards, which washes the cards and records predetermined data on predetermined areas of the cards so that there will not develop erroneous recording, and which rejects cards in case erroneous recording developed, all automatically. The card producing apparatus characterized by the structure comprising a feeder that takes out a predetermined number of accommdated cards every time, magnetic data recording means for recording magnetic data on cards, a cleaner for washing the surfaces of cards, a printer for printing data on the surfaces of cards, a stacker for accommodating cards on which data are recorded, card carrier devices in the apparatus, and a controller for controlling them.

11 Claims, 31 Drawing Sheets

APPARATUS FOR PRODUCING AN INFORMATION RECORDING CARD

DESCRIPTION

1. Field of the Invention

The present invention relates to an apparatus for producing an information recording card having information recorded therein, such as so-called ID cards or prepaid cards.

2. Background Art

Recently, information recording cards of plastics, called an ID card or prepaid card, having not only printed information but also magnetic information recorded therein, have been used.

Such information recording cards are produced by first inserting a plastic card having magnetic stripe into a magneticencoder for recording magnetic information therein, and next transferring the plastic card into a printing apparatus for printing information in the form of letters or figures.

However, problems are encountered in producing such information recording cards. For example, a producer must transport the plastic card to a magnetic encoder or a printing apparatus by manually holding it, much labor is required for the transporting into and out of the card and, additionally, the card surface may be contaminated; it is difficult to place the card in position with minute precision when it should be set at the printing position in the printing apparatus.

The card producing apparatus according to the present invention has been made in view of various problems associated with the above-described prior art. Its first object is to automatically perform writing of magnetic data onto a blank card, checking of the written data, cleaning of the card, and printing of print data. A second object is to place the card in the printing position with minute precision when print data is to be printed on the card. A third object is to perform high-quality printing by providing a card free of dirt when printing is to be performed on the card.

SUMMARY OF THE INVENTION

To achieve the above objects:

The card producing apparatus the present invention is composed of:

a feeder capable of containing a plurality of cards for recording magnetic data and print data therein, and allowing a predetermined number of cards to be removed from it;

a cleaner, including first transporting means for transporting in a predetermined direction the card removed from the feeder, for cleaning the card being transported;

data writing means into which the card cleaned by the cleaner is introduced, the data writing means including second transporting means for transporting in a predetermined direction the cleaned card, for writing magnetic data onto the card being transported;

a printer, including third transporting means for transporting the card which has been introduced into it from the data writing means and which has data written therein, for writing print data on a predetermined portion of the card being transported and for transporting the card out of the printer;

a stacker, including fourth transporting means for introducing the card from the printer into it, for storing a predetermined number of the cards therein;

first detecting means for detecting whether a card is present within the cleaner and for, when no card is present within the cleaner, providing a card introducing command signal to transport a card from the feeder into said cleaner;

second detecting means for detecting whether a card is present within said data writing means and, when no card is present within the data writing means, providing a card transporting command signal to introduce a card from the cleaner to the data writing means;

third detecting means for detecting whether a card is present within the printer and, when no card is present within the printer, providing a card transporting command signal to introduce a card from the data writing means into said printer; and fourth detecting means for detecting the completion of the printing by the printer so that the card transported out of the printer is stored in the stacker.

Other features and advantages of the invention will become apparent upon review of the following drawings and detailed description.

DETAILED DESCRIPTION OF THE PREFERRED EMBODIMENTS

Figure 1:
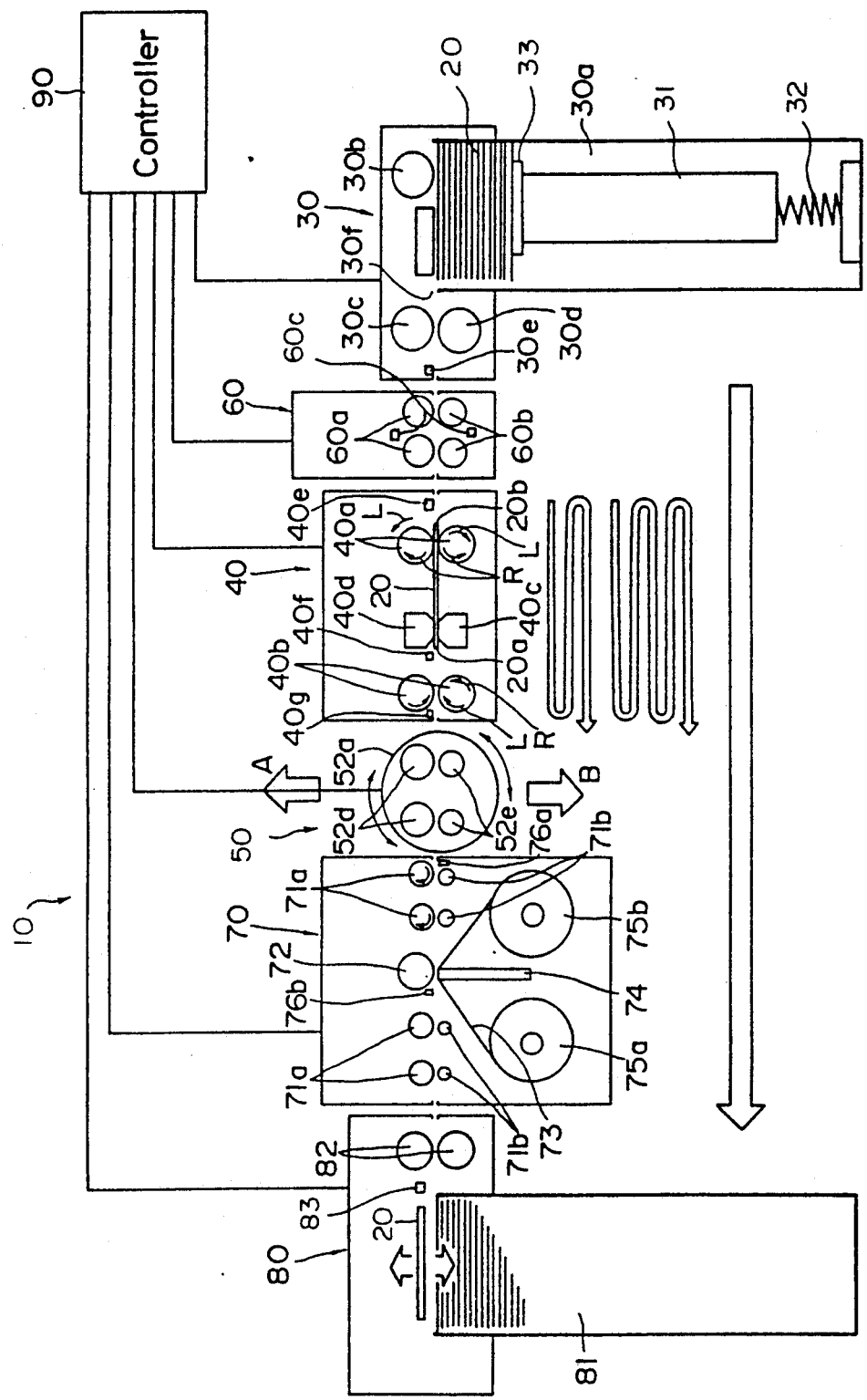
FIG. 1 is a block diagram of an embodiment of the card producing apparatus as claimed in claim 1 of the present invention.

FIG. 1 shows card producing apparatus 10 which comprises: a card feeder 30 for storing cards 20 therein; a cleaner 60 for cleaning the cards 20 before printing; data writing and reading means 40 for recording on the card 20 a magnetically transformed information signal; a card reversing device 50; a printing device 70 for printing the card 20; a stacker 80 for storing the cards 20 therein; and a controller 90 for controlling the operation of the card producing apparatus 10.

The card feeder 30 comprises a cabinet 30a for storing the cards 20 therein, pinch rollers 30b, 30c and 30d for transporting the card 20 to the cleaner 60, and a sensor 30e. The cabinet 30a can store a plurality of cards 20 therein and has a removal opening 30f through which one of the plural cards 20 can be taken out or removed. The card feeder 30 comprises an upright plate 31 which slides within the cabinet 30a in the longitudinal direction of the cabinet 30a. This upright plate 31 forms pressing means for pressing the stacked cards 20 in the direction of thickness of the cards 20, and is urged toward a stopper 33 by a spring 32 provided in the cabinet 30a. The stopper 33 projects in the cabinet 30a, and forms supporting means for supporting the cards 20 against the urging force of the spring 32. The card feeder 30 comprises first transporting means which is constituted by the pinch rollers 30b, 30c and 30d. The pinch roller 30b is provided adjacent to the removal opening 30f so as to transfer to the pinch rollers 30c and 30d a card 20 which is situated at the side of one end of the cabinet 30a. Adjacent to the pinch rollers 30c and 30d in the cabinet 30a, there is provided a sensor 30e which, upon sensing the presence of a card 20 between the pinch rollers 30c and 30d, delivers a control signal to driving means for the pinch roller 30b so as not to rotate the pinch roller 30b.

The cleaner 60 comprises pinch rollers 60a and 60b as second transporting means for transporting the card 20, and nozzles (not shown) for scrubbing the surface to be printed of the card 20 being transported by driving compressed air onto such surface. The pinch rollers 60a and 60b are rotated in accordance with a control signal from the controller 90; the nozzles drive compressed air onto the card 20 in accordance with a control signal from the controller 90. As shown in FIG. 1 cleaner 60 is provided with a sensor 60c as detecting means for detecting the presence of a card 20 within the cleaner 60 and when no card is present with cleaner 60, providing a card introducing signal to transport a card from said feeder into said cleaner. Such sensor is formed by a pair of photocouplers which are arranged such that the card passes between them. The pair of photocouplers is connected to the controller 90; when a card is present between the photocouplers of the pair, an OFF signal is delivered to the controller 90, which will then deliver to the feeder 30 a control signal for prohibiting the transporting of the card 20. When no card 20 is present between the photocouplers of the pair, a control signal is transmitted to the control means 90, which signal allows a card 20 to be introduced into the data writing and reading means 40.

The data writing and reading means 40 comprises: pinch rollers 40a and 40b as third transporting means for transporting the card 20; magnetic heads 40c and 40d capable of changing between an information signal writing mode and a reading mode to read the written data; and sensors 40e, 40f and 40g as detecting means for detecting the leading and trailing edges 20a and 20b, respectively, seen in the direction of transport, of the card 20 present within the data writing and reading means 40, and for transmitting the result of such detection to the controller 90. Sensors 40e, 40f and 40g further assist in detecting whether a card is present within the data writing means and if no card is present provides a card transporting command signal to introduce said card to the data writing means.

The pinch rollers 40a and 40b begin to rotate in a positive direction (the direction as indicated by arrow R in FIG. 1 to transport the card 20 between the magnetic heads 40c and 40d when the leading edge of the card 20 introduced from the pinch rollers 60a and 60b is detected by the sensor 40e which is situated adjacent to the cleaner 60. That is, the sensor 40e will, upon detection of the leading edge 20a of the card 20, transmit the signal of such detection to the controller 90; the controller 90 will transmit a control signal to the driving device for the pinch rollers 40a and 40b for rotating these pinch rollers 40a and 40b in the positive direction in response to such detection signal from the sensor 40e. The sensor 40f, situated adjacent to and spaced a predetermined distance away from the magnetic heads 40c and 40d, is to detect the position of the card 20 for making the magnetic heads 40c and 40d begin to write data, said heads being controlled by the controller 90. The distance of the sensor 40f from the magnetic heads 40c and 40d is determined to correspond to the initiation-of-writing-of-data position of the card 20. When the leading edge 20a of the card 20 is detected by the sensor 40f and the signal of such detection is transmitted to the controller 90, writing of data which is magnetically transformed by the magnetic head 40c based upon write data from the controller 90 is initiated. The feed distance of the card 20 is measured by the controller 90 based on the extent of rotation of the pinch rollers 40a and 40b, and the data is written based on the feed distance of the card. Completion of writing of data of the card 20 is discriminated by the controller 90. Upon detection by the sensor 40f of the trailing edge 20b of the card 20, the controller 90 operates in accordance with the signal of such detection, and the pinch rollers 40a and 40b once stop rotating in the positive direction and initiate rotating in the reversed direction (the direction of arrow L in FIG. 1) for checking the written data. When the trailing edge 20b of the card 20 is again detected by the sensor 40e due to the reversed rotation of the pinch rollers 40a and 40b, the pinch rollers 40a and 40b again stop rotating in the reversed direction and initiate rotating in the positive direction. Upon detection by the sensor 40f of the leading edge 20a of the card 20, the detection signal from the sensor 40f is inputted to the controller 90 and a control command from the controller 90 is transmitted to the magnetic head 40c. In accordance with the control command from the controller 90, the magnetic head 40c is changed into the mode in which it reads the information written in the card 20, so that the magnetic head 40c initiates reading the data from the card 20. The data read by the magnetic head 40c is transmitted to the controller 90 where it is compared with the data to be written into the card 20, whereby whether the data written in one side of the card 20 is normal or abnormal is determined.

The sensor 40g situated adjacent to the card reversing device 50 is a sensor which detects that the card 20 has been removed from the data writing and reading means 40. Upon detection by this sensor 40g of the trailing edge 20b of the card 20, its detection signal is transmitted to the controller 90 to rotate the pinch rollers 40a and 40b, rotate the pinch rollers 60a and 60b, and actuate a transporting mechanism 52 of the card reversing device 50.

The magnetic heads 40c and 40d are for magnetic recording on both sides of the card 20. In this embodiment, both of them are changed into a data writing mode when data is written on both sides of the card 20. The rotation of the pinch rollers 40a and 40b for writing or reading data onto or from both sides of the card 20 will not be described, since it is effected in the same manner as is effected when data is written onto or read from one side of the card 20.

The reversing device 50 for reversing the card comprises a reversing mechanism 51 and the transporting mechanism 52, as shown in detail in FIGS. 3-6.

Figure 6:
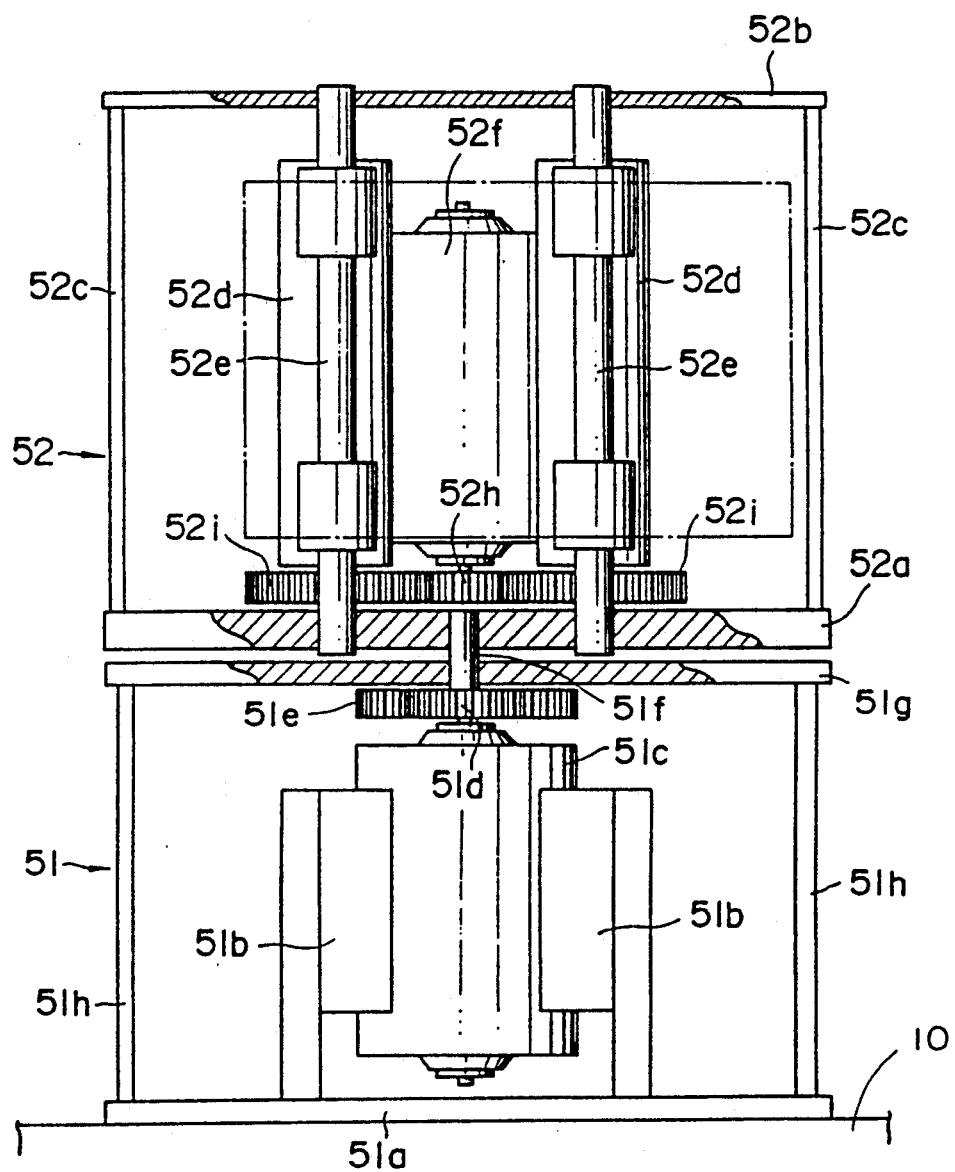
FIG. 6 is a sectional view showing the sectional arrangement of the reversing device of FIG. 3.

As shown in FIG. 6, the reversing mechanism 51 comprises: a base 51a fixed to the card producing apparatus 10; support blocks 51b mounted to the base 51a; a motor 51c supported by the support blocks 51b; a gear 51d mounted on the shaft of the motor 51c; a reducing gear 51e meshing with the gear 51d; a rotating shaft 51f to which the reducing gear 51e is fixed; and a support plate 51g rotatably supporting the rotating shaft 51f. The support plate 51g is supported by support shafts 51h vertically standing on the base 51a. The motor 51c will rotate in accordance with a control command from the controller 90.

As shown in FIG. 6, the transporting mechanism 52 comprises: a turntable 52a mounted to the rotating shaft 51f of the reversing mechanism 51; a support plate 52b situated opposite to the turntable 52a; support shafts 52c for making the support plate 52b be supported by the turntable 52a; pinch rollers 52d and 52e pivoted to the turntable 52a and to the support plate 52b; a motor 52f adapted to make a predetermined number of rotations in accordance with a control command from the controller 90; a gear 52g mounted to the shaft of the motor 52f; a reducing gear 52h meshing with the gear 52g; and gears 52i mounted to the pinch rollers 52d and 52e and meshing with the reducing gear 52h. The reducing gear 52h is mounted to a rotary shaft (not shown) which is journaled to the turntable 52a and to the support plate 52b.

Figure 4:
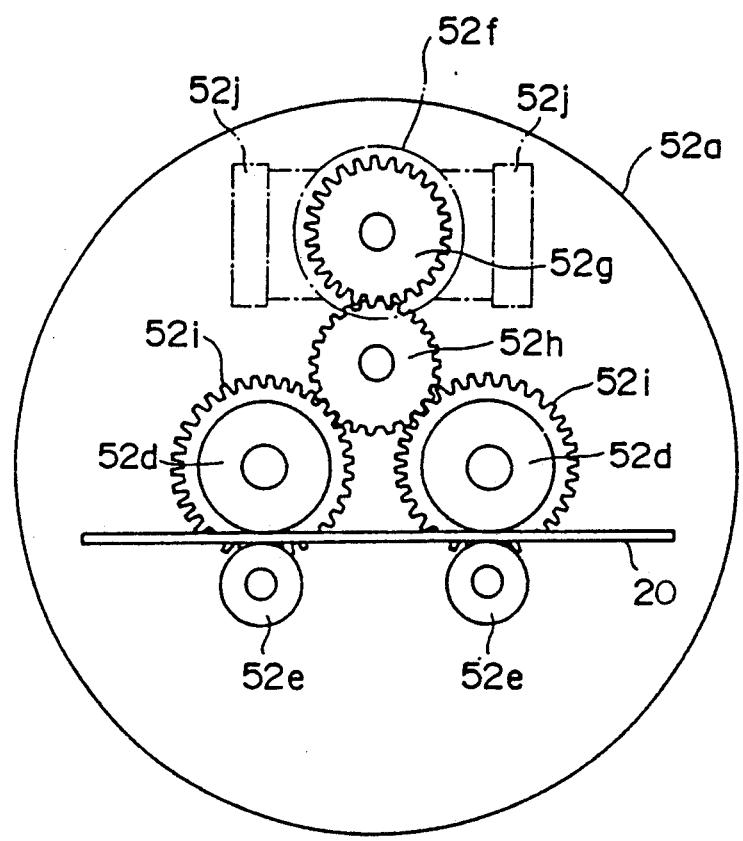
FIG. 4 is an illustration showing the plan arrangement of the gear mechanism above the support plate of FIG. 3.
Figure 5:
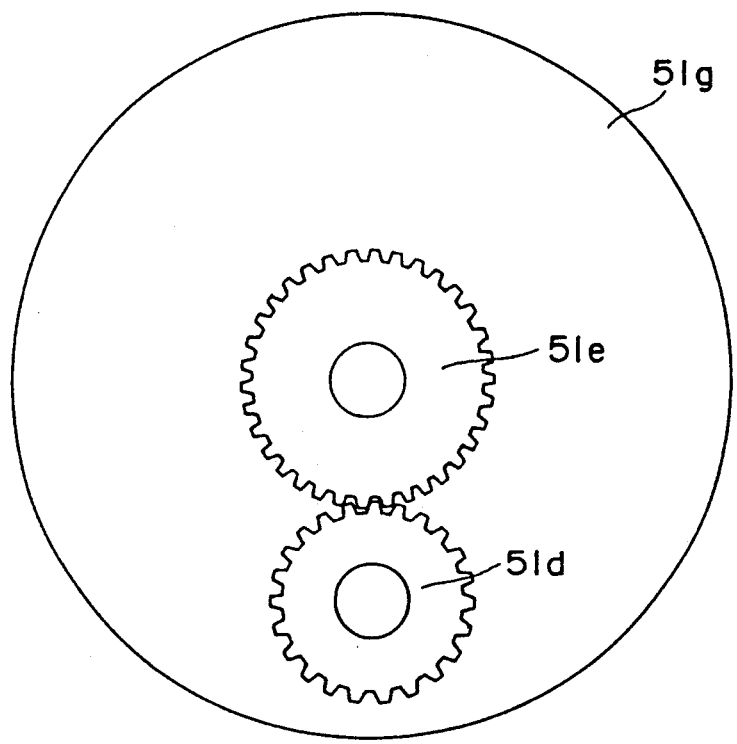
FIG. 5 is an illustration showing the plan arrangement of the gear mechanism below the support plate of FIG. 3.

The motor 52f is supported by support blocks 52j projecting from the turntable 52a (see FIG. 4). The pinch rollers 52d and 52e are associated with a one-way clutch so that it can rotate only in one direction.

The card reversing device 50 reverses a card 20 introduced into the transporting mechanism 52, when the data writing and reading means 40 has performed an operation of writing data in an abnormal manner and when the printing device 70 performs printing on the reverse side of the card. Such reversal of an abnormal card 20 is performed irrespective of whether data is recorded on the top side or on the reverse side.

That is, if there is abnormality in the written data during the data check by the controller 90 of the card 20, control signals from the controller 90 will first cause the transport mechanism 52 to introduce a card 20 and then cause the motor 51c of the reversing mechanism 51 to make a predetermined number of rotations to rotate the turntable 52a through 90 degrees. When the turntable 52a stops after rotation through 90 degrees, the motor 52f again rotates to transport the card 20 in the direction of arrow B in FIG. 1. After completion of transport of the abnormal-data-written card 20, the reversing mechanism 51 will again rotate through 270 degrees in the reversed direction, and the turntable 52a will stop at the initiation-of-rotation reference position. When the turntable 52a is in the initiation-of-rotation reference position, a normal-data-written card 20 from the data writing and reading means 40 is transported to the cleaner 60 by the transporting mechanism 52 without being otherwise operated.

In the case of a card 20 having abnormality in its magnetic stripe, unlike the case of abnormal data written, the turntable 52a is rotated through 90 degrees to transport the card 20 in the direction of arrow A in FIG. 1. When data is to be written onto both sides of the card 20 by the data writing and reading means 40, pinch rollers 40a and 40b are rotated in the same manner as they are rotated when data is to be written onto only one side, except that writing and reading of data is performed by the magnetic head 40d.

In the case of a card 20 to be printed, written data and printed data on one side of the card are checked against each other when the card 20 is within the card reversing device 50. If discrepancy is found by the checking, the turntable 52a will rotate through 90 degrees from the initiation-of-rotation reference position of the turntable 52a and the card 20 will be kept at a predetermined place by the transporting mechanism 51.

A card 20 not having abnormality in the written data but kept by some cause such as errors, will again be introduced into the data writing and reading means 40 which is set in the data reading mode, where the card 20 is checked with respect to the written data; in accordance with such written data, print data adjustment of the printing device 70 is effected and, thereafter, printing is effected by the printing device 70.

The printing device 70 as an embodiment of the printer of apparatus 10 comprises: pinch rollers 71a and 71b capable of transporting the card 20 toward the stacker 80; a platen roller 72 for supporting the card 20; a thermal head 74 for applying a thermal ribbon 73 thereon; reels 75a and 75b for winding the thermal ribbon 73 thereon; and sensors 76a and 76b as detecting means for detecting the position of transport of the card 20 being transported by the pinch rollers 71a and 71b. Thus, sensor 76a detects whether a card is present within the printer and if no card is present provides a card transporting command signal to introduce said card from the data writing means into the printer while sensor 76b detects a card leaving the printer. The pinch rollers 71a and 71b, platen roller 72, thermal head 74 and reels 75a and 75b, respectively extending in the direction of width of the card 20, form together an embodiment of the third transporting means according to the present invention. The thermal head 74 is associated with a drive mechanism (not shown) in such a manner that the head with the thermal ribbon 73 applied thereon is moved toward and away from the platen roller 74 so as to press against the card 20 being transported toward the stacker 80, with the thermal ribbon 73 situated therebetween for effecting thermal transfer. The thermal head 74 has a great number of exothermic elements of minute cross section, arranged at the tip of the thermal head in the direction of width of the card 20; under the control of the controller 90, prescribed ones of the exothermic elements are caused to give off heat. The thermal ribbon 73 can transfer a dye to the card 20 by virtue of the heat evolved from the thermal head 74; in this embodiment, a monochromatic ribbon is used. The sensor 76a is arranged adjacent to a card inlet opening 70a facing toward the reversing device 50 and the cleaner 60.

The pinch rollers 71a and 71b, platen roller 72, thermal head 74 and reels 75a and 75b are driven by drive mechanisms (not shown) controlled by the controller 90. That is, the pinch rollers 71a and 71b and platen roller 72 are rotated when the leading edge 20a of the card 20 transported from the reversing device 50 is detected by the sensor 76a as the third detecting means, a control signal being transmitted from the controller 90 to the drive mechanisms in response to a detection signal from such sensor 76a. When the leading edge 20a of the card 20 is detected by the sensor 76b adjacent to the platen roller 72, the thermal head 74 will abut against the platen roller 72, with the thermal ribbon 73 intervening therebetween, in response to a detection signal from the sensor 76b and the thermal head 74 will evolve heat. Completion of printing on one side of the card 20 is detected by the control of the exothermic elements of the thermal head 74 by the controller 90.

The stacker 80 comprises a cabinet 81 for storing printed cards 20 therein, and pinch rollers 82 for introducing the card 20 into the cabinet 81. A control signal to rotate the pinch rollers 82 is transmitted from the controller 90 in response to the detection signal from the sensor 76b signifying that the sensor 76b of the printing device 70 has detected the trailing edge 20b of the card 20, whereby the pinch rollers 82 are rotated to lay the card 20 on the stack thereby detecting a completion of printing by sensor 76b by the printer and transporting the card out of the printer to be stored in the stacker. The pinch rollers 82 will stop rotating in response to the detection by a sensor 83 of the leading edge 20a of the card 20. The card transporting mechanism of this card producing apparatus 10 is formed by the pinch rollers 30b, 30c, 30d, 40a, 40b, 52d, 52e, 60a, 60b, 71a, 71b and 82, and the drive mechanisms for them.

An arrangement is also possible, in which the pinch rollers 30b, 30c, 30d, 40a, 40b, 52d, 52e, 60a, 60b, 71a, 71b and 82 are vertically mounted and the card 20 is transported while being held in a vertical position in order that dust can hardly adhere to the surface of the card 20, and the card 20 can be easily removed from the card feeder 30 or stacker 80.

Figure 2:
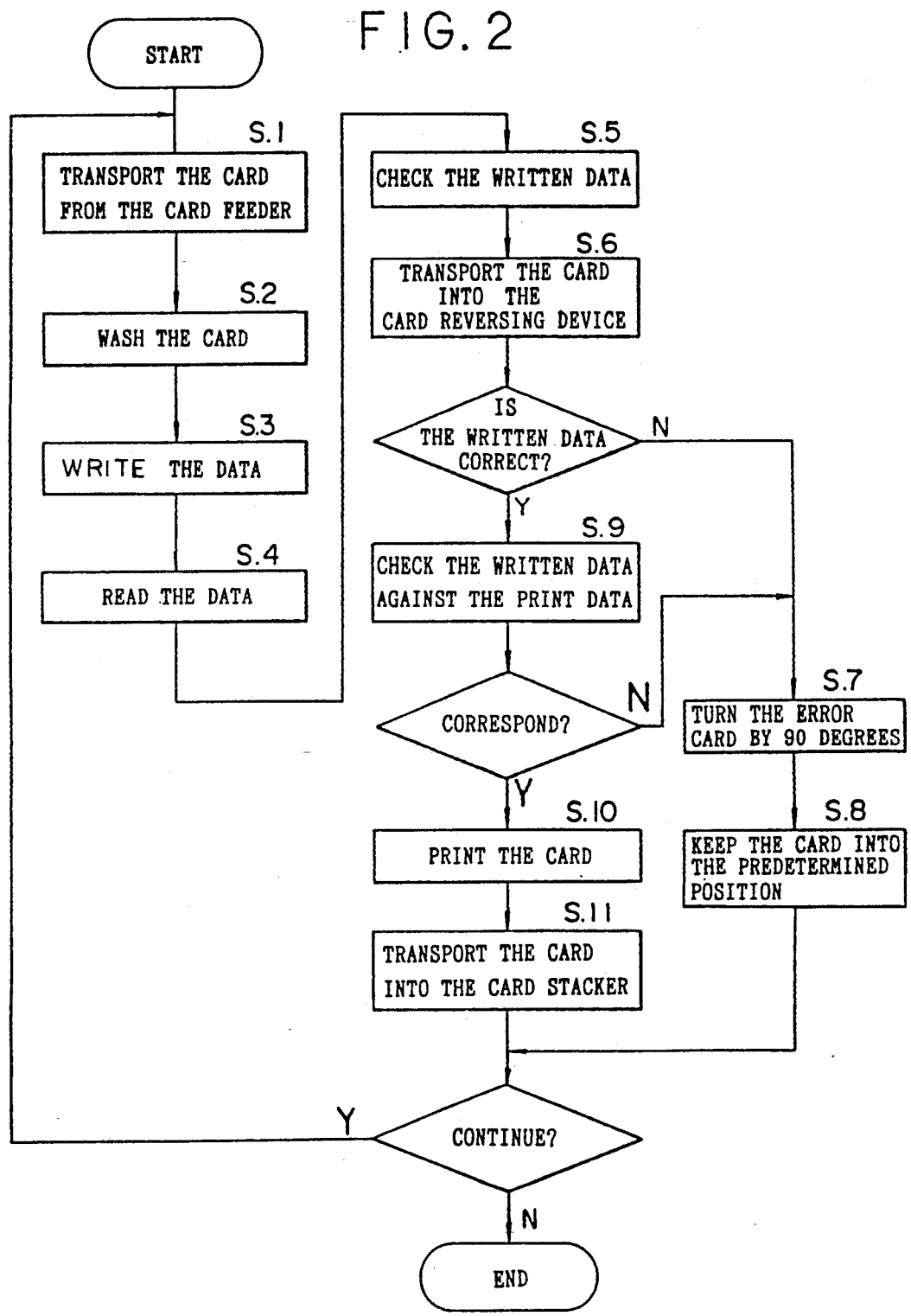
FIG. 2 is a flow chart of the embodiment of the card producing apparatus as claimed in claim 1 of the present invention.
Figure 3:
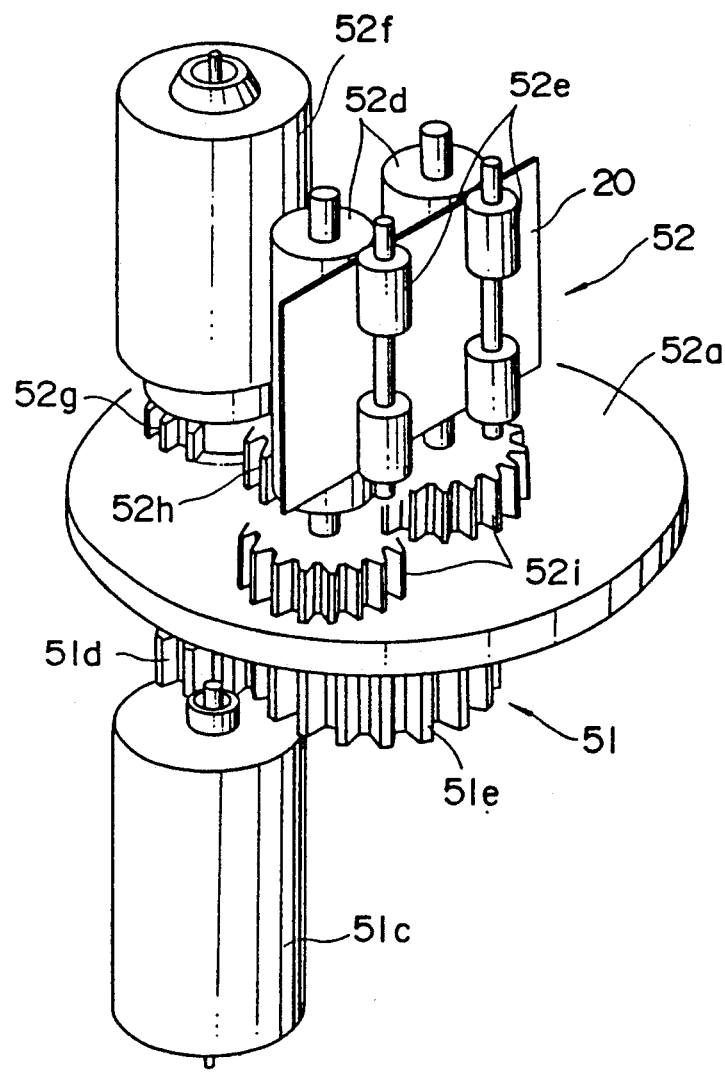
FIG. 3 is a schematic perspective view showing the reversingdevice of an embodiment of the card producing apparatus as claimed in claim 3 of the present invention.

FIG. 2 is a flowchart showing the manner of control by the controller 90 for controlling the entire card producing apparatus 10. The manner of control will be described in sequence.

As described with respect to the card feeder 30, it is ensured that no card 20 is present in the cleaner 60 before step 1. Thereafter, one card 20 is removed from the card feeder 30 and transported to the cleaner 60 (step 1).

In the data writing and reading means 40, the pinch rollers 40a and 40b are rotated in the positive direction when the leading edge 20a of the card 20 is detected by the sensor 40e, and the magnetic head 40c abuts against both sides of the card 20 for writing data thereon when the leading edge 20a of the card 20 has been detected by the sensor 40f (step 3).

When the completion of writing data on the card 20 has been found by the controller 90, the pinch rollers 40a and 40b are rotated in the reverse direction to transport the card 20 toward the cleaner 60. When the leading edge 20a of the card 20 has been again detected by the sensor 40e, the pinch rollers 40a and 40b are again rotated in the positive direction to transport the card 20 toward the reversing device 50. When the leading edge 20a of the card 20 has been again detected by the sensor 40f, the magnetic head 40c is changed into the data reading mode in which it abuts against the card 20 for reading the data written on both sides of the card 20 (step 4).

Within the controller 90, the read data is compared with the data to be recorded so as to check the written data (step 5).

If abnormality is found in the written data during the checking of data by the data writing and reading means 40, then the card reversing device 50 will, after introduction of the card 20 (step 6), turn the card 20 through 90 degrees (step 7) and discharge the card 20 in the direction of A in FIG. 1 (step 8). If such data check shows that the data has been normally written, then the written data is checked against the print data (step 9).

When data is to be written on both sides of the card 20, the magnetic heads 40c and 40d are actuated simultaneously to perform checking of the magnetic stripe, writing of data, checking of the written data, and checking of the written data against the print data (steps 1–9).

If such checking operation shows that the written data is inconsistent with the print data (step 9), the turntable 52a of card reversing 50 is turned through 90 degrees (step 7) from the initiation-of-rotation reference position after the card is introduced into device 50 (step 6). The card having information written therein is transported in the predetermined direction, and such card 20 is kept at a predetermined location (step 8). If the written data in the card 20 is consistent with the print data, printing onto one side of the card 20 is initially performed by the printing device 70 (step 10). After the one side of the card 20 has been printed by the printing device 70, the card 20 is returned to the reversing device 50 and the cleaner 60 by again rotating the pinch rollers 71a and 71b and platen roller 72 in the reversed direction, where the card 20 is reversed. After the card 20 is reversed or turned through 180 degrees, the printed card 20 is stored within the stacker 80 (step 11).

Figure 7:
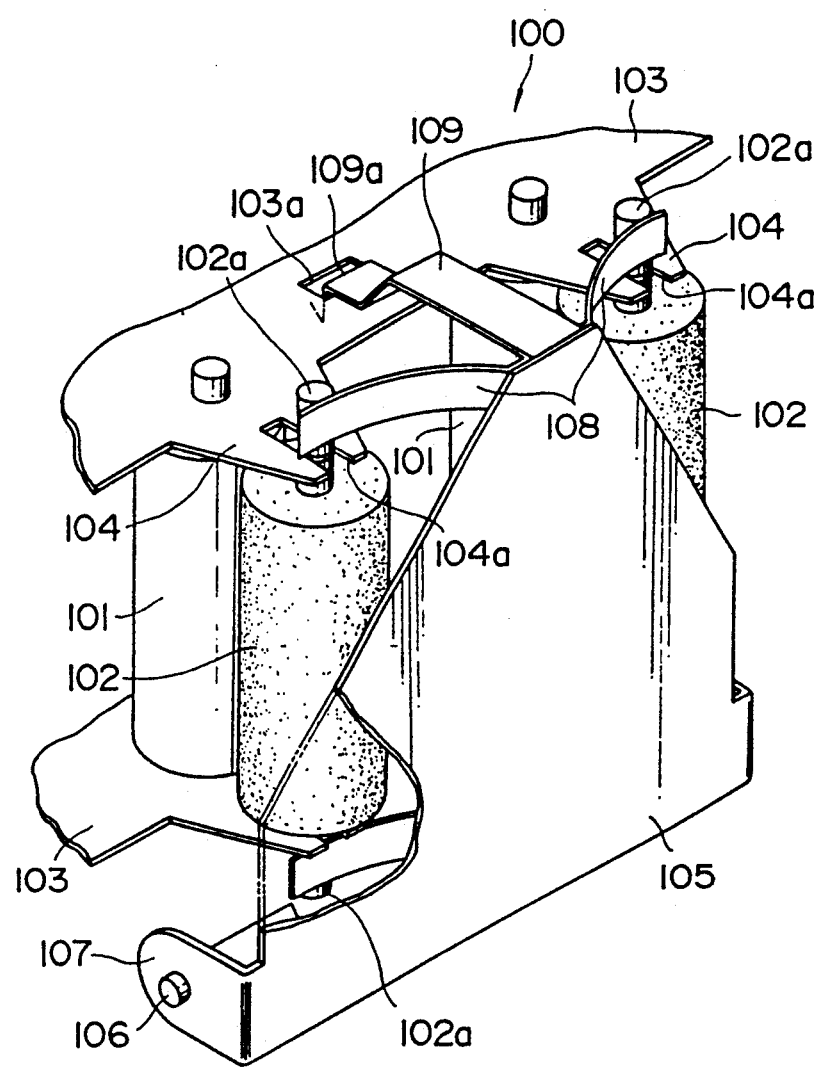
FIG. 7 is a schematic perspective view showing the arrangement of part of the cleaner of the embodiment according to claim 4 of the present invention.

If the production of a card is continued, control is again returned to step 1 to enter the producing operations of a new card. If a further card is not to be produced, then the write data and print data are erased to set the card producing apparatus in a stand-by state preparatory to the production of the FIG. 7 shows an embodiment of the cleaner 100 is different from that shown in apparatus 10. That is, in the cleaner 100, it is the part which is situated adjacent to the data writing and reading means 40 that serves as the card inlet section. FIG. 7 is a perspective view showing the arrangement of this cleaner 100, which comprises driving rollers 101, and cleaning rollers 102 having a sticky material provided on the surface. The driving rollers 101 are rotatably supported by a pair of support plates 103, and are driven for rotation by driving means not shown. Each support plate 103 has a pair of bearing projections 104 for supporting the cleaning rollers 102, each projection 104 having a split groove 104a formed at its forward end for holding a mounting shaft 102a of the cleaning roller 102. A material having a sticky surface, such as silicone rubber or urethane rubber, is used as the sticky material on the cleaning roller 102; in this embodiment, silicone rubber is used. The silicone rubber is formed into a roller having a mounting shaft 102a held at its center. On one side of the projections 104, there is provided a press-fitting plate 105 for placing the mounting shafts 102a of the cleaning rollers 102 within the split grooves 104a.

The press-fitting plate 105 comprises: mounting pieces 107 pivotably mounted on a transverse shaft 106 extending on one side of the support plates 103 in such a manner that it will turn toward the projections 104; plate spring portions 108 which press the mounting shafts 102a of the cleaning rollers 102 toward the bottoms of the split grooves 104a; and a catching piece 109 which presses the plate spring portions 108 against the mounting shafts 102a by latcing the press-fitting plate 105 to the support plate 103. The catching piece 109 comprises a claw portion which is removably engages in an engaging opening 103a in the support plate 103.

In this embodiment of the card producing apparatus, the cleaning rollers 102 will rotate and closely contact the surface of the card 20 when the card 20 is interposed and transported between the driving rollers 101 and the cleaning rollers 102. Since the surface of the cleaning rollers 102 is formed by silicone rubber, dust on the surface of the card 20 will adhere to the silicone rubber and hence be removed from the card 20. The cleaning rollers 102 will rotate continuously, but the dust adhering to the silicone rubber will not fall from the silicone rubber, nor will it again adhere to the subsequent card 20. In addition, since one set of cleaning rollers 102 are arranged in the direction in which the card 20 is transported, dust on the surface of the card 20 can be sufficiently removed. If dust is deposited on the cleaning rollers 102, the claw portion 109a of the press-fitting plate 105 may be disengaged from the engaging opening 103a in the support plate 103 so as to make it possible to remove from the split grooves 104a the mounting shafts 102a of the cleaning rollers 102 pressed by the plate springs 108; then, the cleaning rollers 102 may be washed with e.g. tepid water, and again mounted. Therefore, the cleaning rollers 102 can be very easily washed.

In this embodiment, the sticky members are formed by rollers, but the invention is not limited to this. For example, another arrangement is possible, in which sticky sheets wound in a roll form, instead of the cleaning rollers 102, are mounted in the split grooves 104a via mounting shafts. These sticky sheets are made to come into contact with the surface of the card 20 being transported so that dust on the surface of the card 20 may adhere to the sticky sheets. The sticky sheets with the dust adhering thereto are then removed and wound up. In this alternative arrangement, cards can be washed successively only by exchanging the sticky sheets.

A further alternative arrangement is possible, in which a sticky tape in the form of an endless belt of silicone rubber or urethane rubber is interposed between non-sticky cleaning rollers 102 and the card 20. The sticky tape is rotated together with the cleaning rollers 102 and, after the card has been washed, this tape is removed from the cleaner and immersed in tepid water.

Further, if both of the driving rollers 101 and the cleaning rollers 102 are replaced by rollers of silicone rubber, then it is possible to simultaneously wash both sides of the card.

Figure 8:
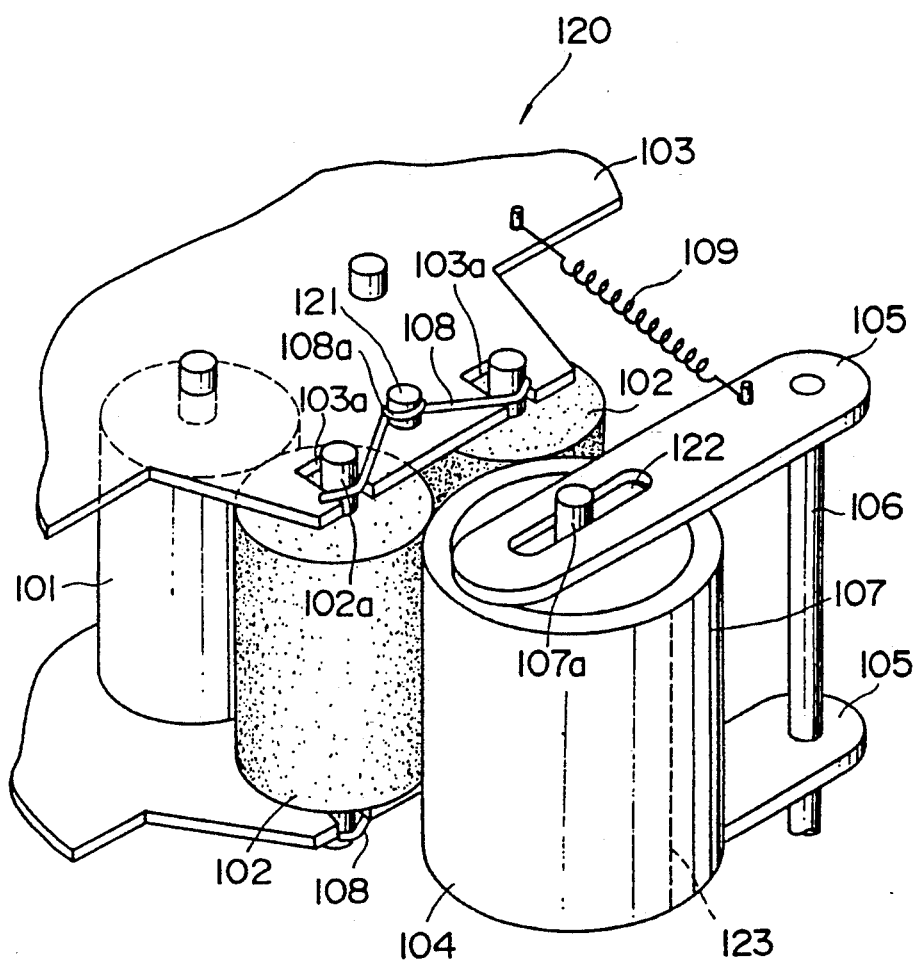
FIG. 8 is a perspective view showing part of the arrangement of the cleaner of the embodiment according to claim 5 of the present invention.

FIG. 8 shows the cleaner 120 another embodiment of a cleaner for use with apparatus 10 in the form of. In this embodiment, mounting shafts 102a of cleaning rollers 102 are urged to the interior of split grooves 103a by roller pressing springs 108, whereby the cleaning rollers 102 are placed in the split grooves 103a. The center of the roller pressing springs 108 is formed as a coiled portion 108a which is removably fixed to a projection 121 projecting from a support plate 103.

A tape 104 having an adhesive strength stronger than that of the cleaning rollers 102 is wound on a drum 107 which is mounted in slots 122 through holders 105 on a mounting shaft 106 which extends from a housing not shown.

The tape 104 has an adhesive coated on its one side which abuts against the cleaning rollers 102. The tape 104 comprises a base of non-woven fabric having coated thereon an acrylic resin which has an adhesive strength stronger than that of silicone rubber, and is wound such that the adhesive faces toward outside. The tape 104 abuts against the cleaning rollers 102, whereby dust on the cleaning rollers 102 will adhere to the adhesive on the tape 104. By cutting, along stitches 123, the outer surface portion of roll form, a new adhesive can be readily obtained, obviating the necessity of washing the cleaning rollers. A mounting shaft 107a of the drum 107 will reciprocate in the slots 122 in the holders 105. The holders 105 are pivotably mounted to the housing, and an end of a spring 109 is connected thereto, the other end of the spring being connected to the support 103. The holders 105 are urged toward the cleaning rollers 102 by the pulling force of the spring 109, whereby the side of the tape 104 which has the adhesive coated is made to come into contact with the cleaning rollers 102. Since the arrangement of the card producing apparatus 10 is otherwise similar when used with cleaner 120 no further description is necessary.

Figure 9:
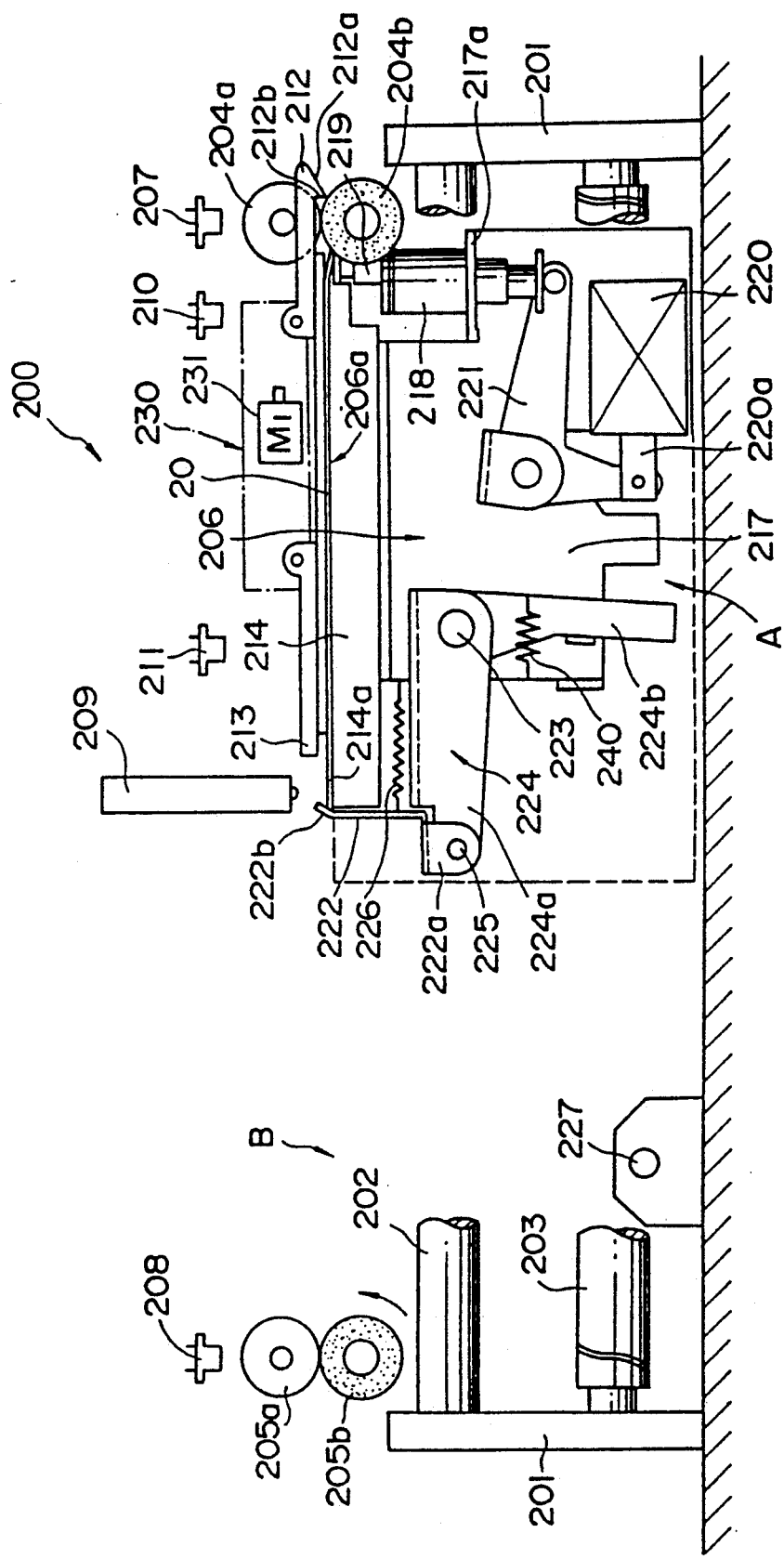
FIG. 9 is an illustration showing the arrangement of the printer of the embodiment according to claim 6 of the present invention.

FIG. 9 schematically shows a different printer embodiment of apparatus 10 in the form of printer 200 of the card producing apparatus, in which a card 20 is automatically transported from the right hand side in this figure. That is, the printer includes a housing (not shown) in which a pair of support plates 201 is arranged. Between these support plates 201 of the pair, a pair of slide shafts 202 and a screw rod 203 are provided. The screw rod 203 is rotated in positive and reverse directions, the number of rotations being determined by a pulse (not shown). Transport rollers 204a and 204b, which hold and transport a card 20, are provided above the support plates 201, which is situated at a card inlet position A in which the card is introduced. Further, transport rollers 205a and 205b for removing the card from the printer 200 are provided above the support plates 201 which are situated at a card outlet position B. A stage 206 for transporting the card 20 is mounted on the slide shafts 202 and the screw rod 203, which stage 206 is guided along the slide shafts 202 by the rotation of the screw rod 203. The card 20, which is transported by the movement of the stage 206, is detected by sensors 207 and 208 which are provided above the transport rollers 204a and 204b; 205a, and 205b, respectively. A thermal head 209, which effects printing on the card 20 through a thermal ribbon (not shown), is provided at an intermediate location in a region in which the stage 206 is movable. The thermal head 209 is moved upward and downward by an elevator (not shown) in such a manner that it will move downward to a position to initiate printing on the card 20 when the screw rod 203 has performed a predetermined number of rotations from a still state, and will then move upward, away from a termination-of-printing position, when the screw 203 rod has performed a predetermined number of rotations from a still state. Sensors 210 and 211 are provided between the thermal head 209 and the sensor 207. These sensors 207, 210 and 211 are for driving a retracting claw 212 for transferring the card 20 to a support surface 206a of the stage 206 after the card has been introduced from the transport rollers 204a and 204b. Further, the sensor 211 is for driving an extruding claw 213 for moving the card 20 from the stage 206 toward the transport rollers 205a and 205b when the stage 206 has been moved toward one side of the transport rollers 205a and 205b.

Figure 12:
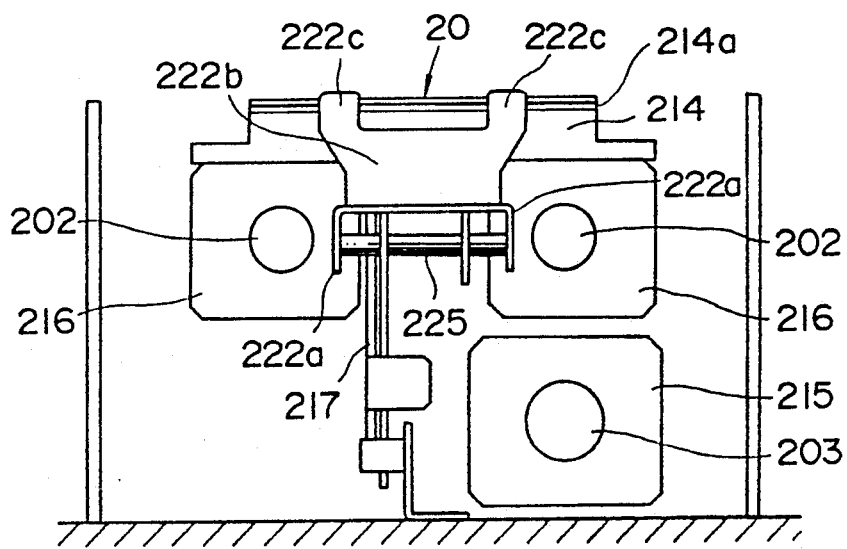
FIG. 12 is an illustration schematically showing the side arrangement of the stage of the printer of FIG. 9.
Figure 13:
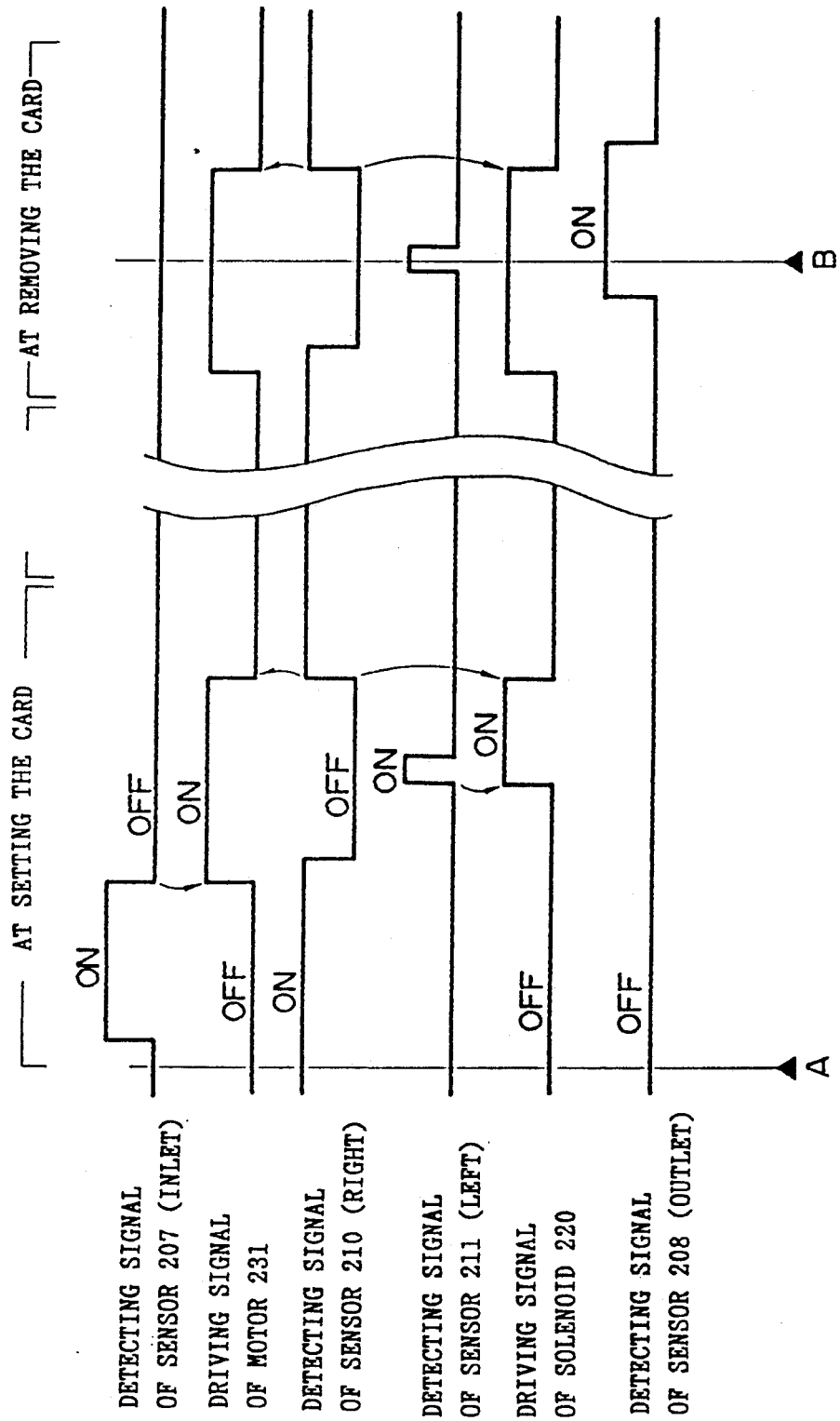
FIG. 13 is a timing chart of the printer of FIG. 9.

The stage 206 comprises: a stage body 214; a block 215 with a threaded bore for engagement with the screw rod 203; and a pair of guide blocks 216 which slide on the slide shafts 202 (see FIG. 12). On top of the stage body 214, there is laid a mat of rubber 214a which forms the support surface for the card 20. A recess 214b is formed at each of the four corners of the stage body 214. The guide blocks 216 of the pair are fixed to and integral with the stage body 214. The block 215 with the threaded bore is attached to a chassis 217 which in turn is attached to these guide blocks 216, in such a manner that an axial driving force can be transmitted without transmitting noises such as backlash. On the trailing edge of the chassis 217, there is formed a perpendicularly projecting cut-up piece 217a which has a guide bushing 218 provided therein. The guide bushing 218 has a card restraining pin 219 projecting therefrom, which pin catches the trailing edge of the card 20 on the mat 214a. The card restraining pin 219 passes into and out of the recess 214b in the stage body 214. The card restraining pin 219 is moved upward and downward by a solenoid 220 which is attached to the rear of the chassis 217. The forward and backward movement of a pin 220a of the solenoid 220 is transmitted to a link arm 221 which is attached to the chassis 217, and the card restraining pin 219 is moved upward and downward by the rotation of the link arm 221. The solenoid 220 will pull the link arm 221, causing the trailing edge of the card 20 to be held in a catching groove 219a in the card restraining pin 219, when said retracting claw 212 has transported the card 20 to a predetermined position on the mat 214a on the stage body 214. Further, the pin 220a of the solenoid 220 will release the fixed trailing edge of the card 20 by pulling the link arm 221 to make the pin 219 farther protrude by an additional short distance when the stage 206 has reached the transport rollers 205a and 205b and, subsequently, will push the link arm 221 outward to lower the card restraining pin 219 below the surface of the mat 214a after the extruding claw 213 has passed the card 20 to the transfer rollers 205a and 205b.

A card restraining arm 222 for catching the leading edge of the card 20 is provided on the front of the chassis. A shaft 223, which perpendicularly projects from the chassis 217, is attached to the front of the chassis 217, an I-shaped link arm 224 being rotatably mounted to shaft 223. An upper limb 224a of the link arm 224 comprises a pair of parallel flanges which can rotate about the shaft 223, and a parallel piece inter-connecting the upper parts of these parallel flanges of the pair. To the forward ends of the parallel flanges of the pair, there is attached a shaft 225 to which said card restraining arm 222 is rotatably attached. The card restraining arm 222 is formed by a pair of flanges 222a rotatably attached to the ends of the shaft 225, and a catching plate portion 222b which comprises the pair of flanges 222a on both sides thereof and catches the leading end of the card 20. On the forward end of the catching plate portion 222b, there is formed a pair of catching projections 222c (FIG. 11) which catches the leading edge of the card 20. The catching projections 222c of the pair are bent toward the stage body 214. The catching plate portion 222b is pulled toward the forward end of the stage body 214 by a spring 226 which is attached to the chassis 217. The catching projections 222c of the pair pass into and out of the recess 214b in the stage body 214. The catching projections 222c of the pair project slightly above the card 20 when the link arm 224 is in a position in which it is pulled by the spring 226. A lower limb 224b of the link arm 224 extends below the chassis 217 and, when the stage 206 has been moved toward one side of the transport rollers 205a and 205b, it is pressed by a stopper rod 227 (FIG. 9) which is provided on the printer housing at one side of the transport rollers 205a and 205b. When the lower limb 224b is in an abutting position against the stopper rod 227, the link arm 224 will rotate and the catching projections 222c of the pair is pulled by the spring 226, sliding down a forward wall surface 214c of the stage body 214 as the stage 206 moves. Then, because the recess 214b is formed in the stage body 214 and the leading edge of the card 20 is then situated above this recess 214, the catching projections 222c will pass into the space under the card 20 when it descends (see FIG. 10).

Next, a description will be given with respect to a catching member for making the trailing edge 20b of the card slide to a predetermined position on the mat 214a, and a pressing member for pressing the trailing edge 20b of the card 20 toward the position for removal of the card 20 when the stage 206 is in the position of removal of the card 20.

The catching member is formed by said retracting claw 212, while the pressing member is formed by said extruding claw 213.

Figure 10:
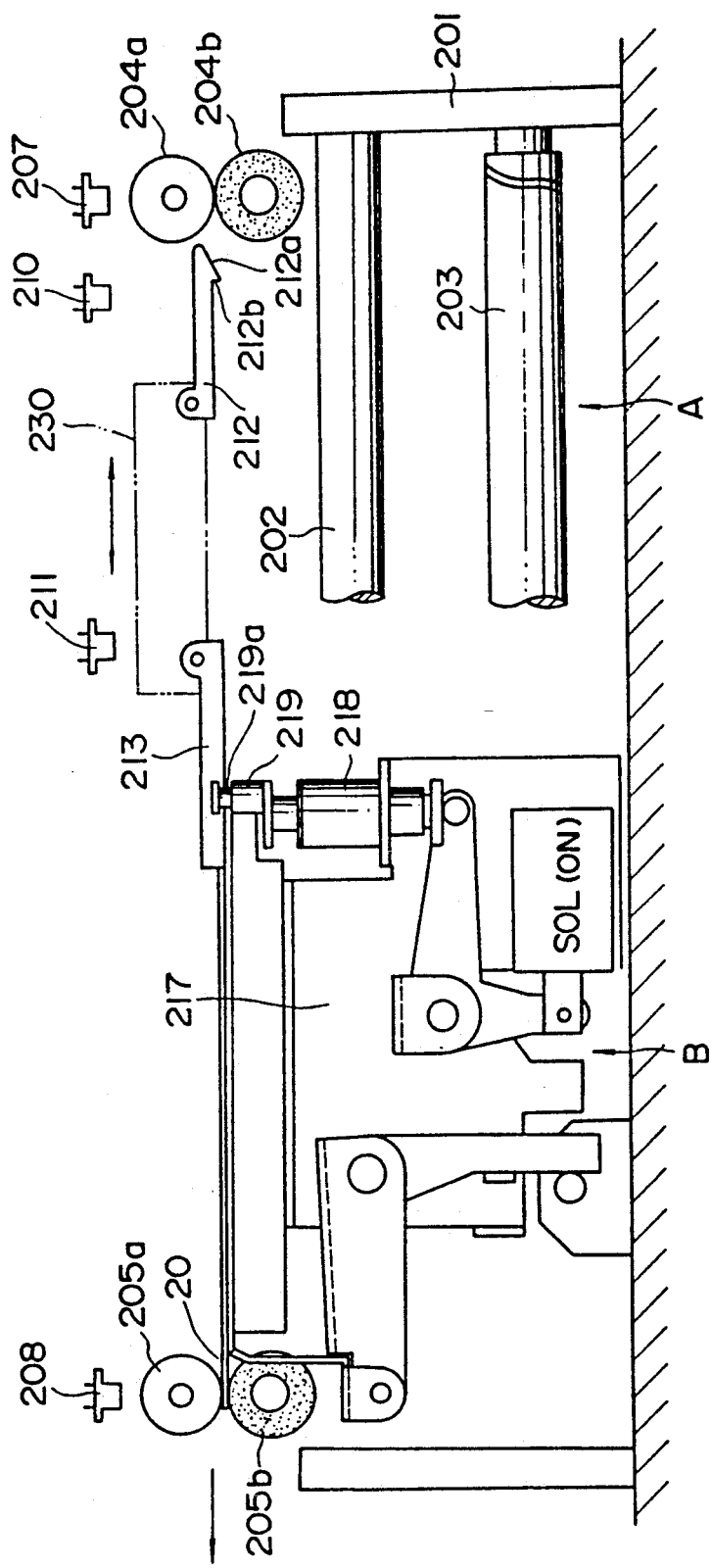
FIG. 10 is an illustration in which the stage of the printer of FIG. 9 has been moved to a card removing position.
Figure 11:
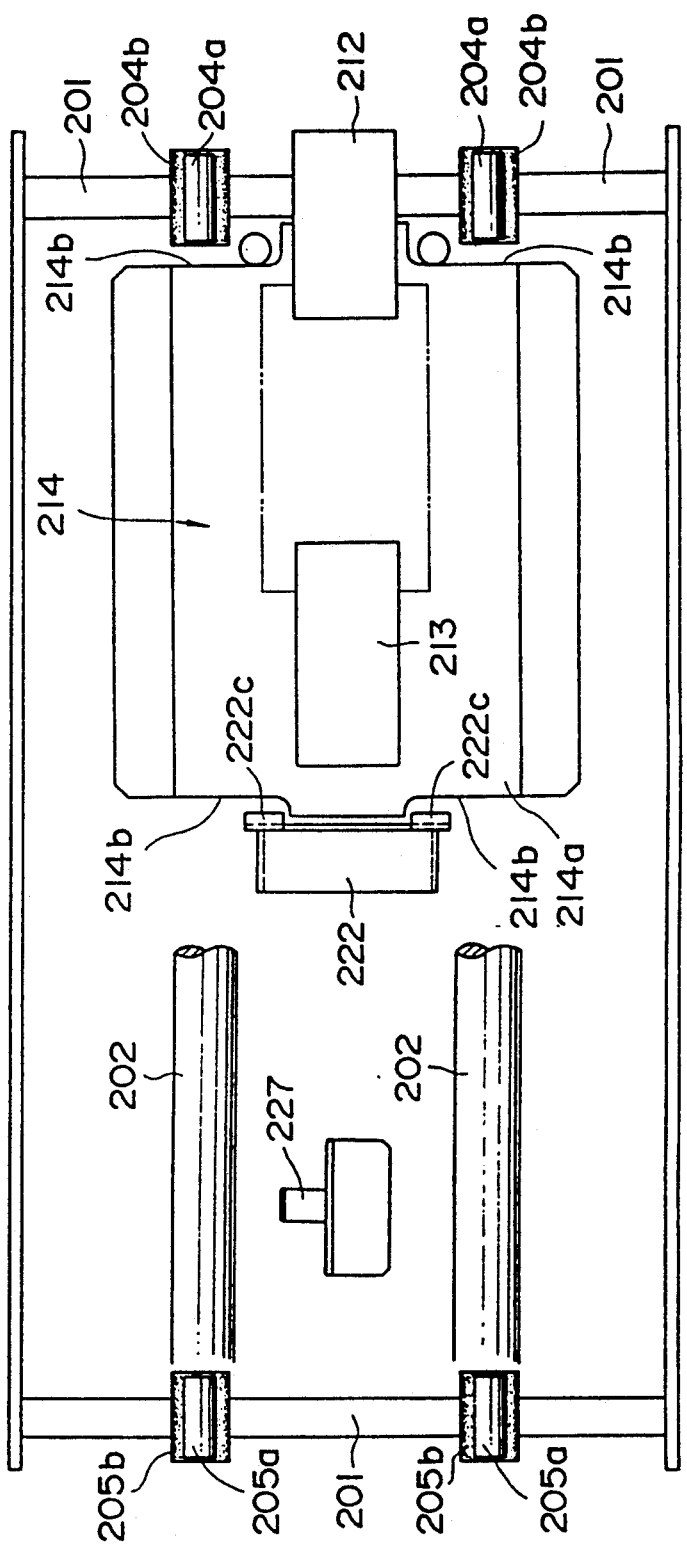
FIG. 11 is an illustration schematically showing the plan arrangement of the stage of the pringer of FIG. 9.

The retracting claw 212 and the extruding claw 213 are arranged on a slider 230 which reciprocates between the transport rollers 204a and 204b and the thermal head 209. As shown in FIG. 10, at one point slider 230 has moved to a position where the free end of claw 213 engages the tracting edge of card 20 and thereafter crosses the leading edge into engagement with transport rollers 205a and 205b to facilitate discharge of the engaged card 20. The slider 230 is linked to a driving motor 231 through a link mechanism not shown, whereby a driving power is transmitted. The drive mechanism for driving the slider 230 is formed by e.g. gear or belt mechanisms driven by the motor 231. The retracting claw 212 is rotatably provided at a portion of the side of the slider 230 which faces toward the transport rollers 204a and 204b. On the end of the side of the retracting claw 212 which faces toward the transport rollers 204a and 204b, there is formed an inclined surface 212a which can ride on top of the card 20, as well as a hook portion 212b which supports the trailing edge of the card 20. When the card 20 is not yet introduced, a clearance corresponding to the thickness of the card 20 is formed between the retracting claw 212 and the mat 214a; when the card 20 is introduced, the retracting claw 212 will rotate such that the inclined surface 212a can pass over the leading edge of the card 20. The card 20 held between the transport rollers 204a and 204b would not completely be in the predetermined position on the mat 214a when it is disengaged from the transport rollers 204a and 204b, but it will be shifted toward the prescribed position on the mat 214a because the retracting claw 212 causes the card 20 to slide. It is the driving power from the drive motor 231 that will place the card 20 at the predetermined position on the mat 214a. The drive motor 231 is controlled by output signals from the sensors 207, 210 and 211. That is, when the card 20 is held between the transport rollers 204a and 204b, the slider 230 and the stage 206 are in a stand-by position close to the transport rollers 204a and 204b. Upon turning-off of the sensor 207 by the detection of the trailing edge 20b of the card 20 after its turning-on by the detection of the leading edge of the card 20, the drive motor 231 will operate in accordance with an off-signal from the sensor 207, whereby the hook portion 212b of the retracting claw 212 will push the trailing edge of the card 20 toward the thermal head 209 so as to make the card 20 slide into the predetermined position on the mat 214a. The sensor 210, which detects whether or not the slider 230 is present in a stand-by position, will turn off when the slider moves from the stand-by position.

The drive motor 231, after setting the card 20 in the predetermined position on the mat 214a by means of the retracting claw 212, is driven for rotation in the reverse direction until the slider 230 is returned to the transport rollers 204a and 204b. The sensor 210, which detects slider 230, will turn on when slider 230 again passes under the sensor 210 so as to stop the drive motor 231.

That is, the drive motor 231 will initiate driving in response to the falling edge of an off-signal from the sensor 207, and will stop in response to the rising edge of an on-signal from the sensor 210. In response to the off-signal to the drive motor 231, the screw rod 203 will rotate to move the stage 206 toward the thermal head 209.

The sensor 211, which is for detecting the time at which the pin 219 is to be pushed up to set the card 20, will turn on upon the completion of a movement of the slider 230 to the leftmost position in the figure. That is, the sensor 211 will turn on at the moment when the card 20 pass leftward beyond a predetermined fixed position, the solenoid 220 being turned on at that moment so as to push up the card restraining pin 219. The slider 230 will thereby initiate an action of returning, and the card 20 will also be returned by the arm 222 simultaneously but it will stop after collision against a grooved portion of the pin 219. Upon detection of the slider 230 by the sensor 210 after a further return movement of the slider, the drive motor 231 is stopped and the solenoid 220 is turned off simultaneously. The pin 219 will thereby press the card 20 against the mat 214a, firmly fixing the card 20. The slider 230 will stop at the stand-by position.

The stage, with the card 20 fixed by the card restraining arm 222 and the card restraining pin 219, will be moved by the screw rod 203 to a position where transfer to the card 20 should be initiated. Next, the thermal head 209 is pressed against the card with a thermal ribbon situated between them so as to effect printing as the stage 206 is moved.

When the stage is within a transfer region, the screw rod and the link arm 224 are in a positional relation in which they cannot contact each other, and the transfer is completed with the card 20 remaining fixed to the stage 206.

After completion of the transfer, the stage 206 is moved leftward further, the link arm 224 will collide against the screw rod 227, the link arm 224 will rotate counterclockwise, the card restraining arm 222 will descend, the catching projections 222c of the pair will pass into the space under the card 20, and the restraint on the leading edge of the card 20 is thus removed. The stage 206 will then stop. Next, the solenoid 220 is turned on to raise the card restraining pin 219 and remove the force which presses the trailing edge of the card 20 against the mat 214a. Simultaneously, the drive motor 231 is turned on to move the slider 230 leftward. The card 20, squeezed between the rollers 205a and 205b mounted to the slider 230, is discharged to the outside. The slider 230 initiates a return movement by the link mechanism; upon turning on of the sensor 210, the drive motor 231 is stopped and the solenoid 220 is turned off. The slider 230 is thereby put into a stand-by state, and remains in such state until the next card 20 is introduced.

Figure 14:
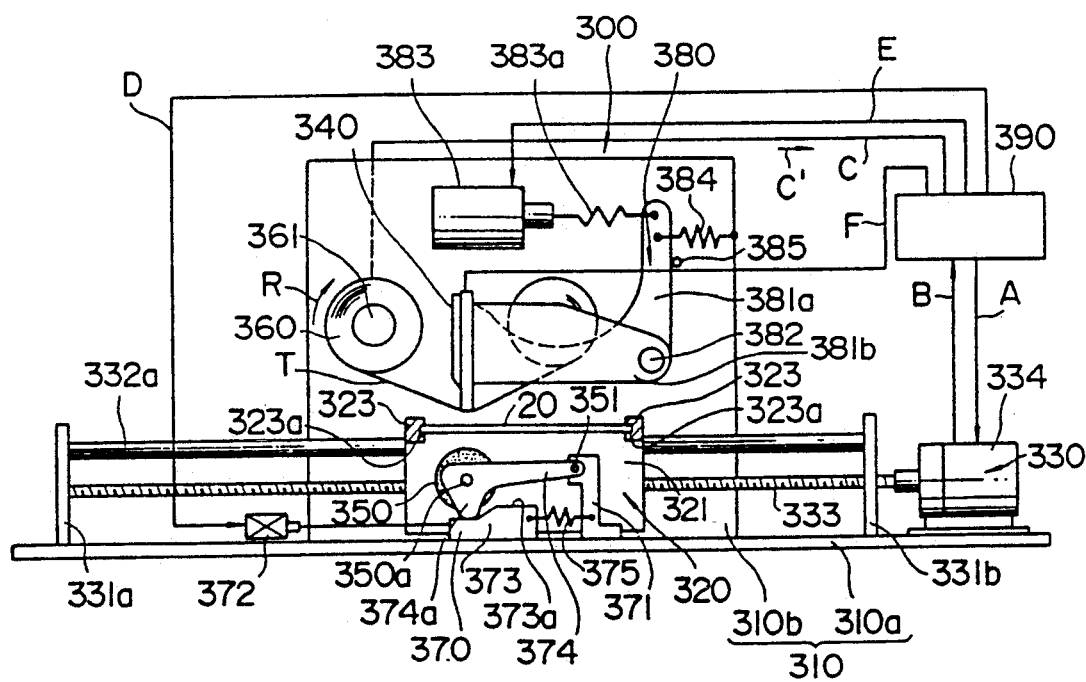
FIG. 14 is an illustration showing the arrangement of the printer of the embodiment according to claim 7 of the present invention.
Figure 15:
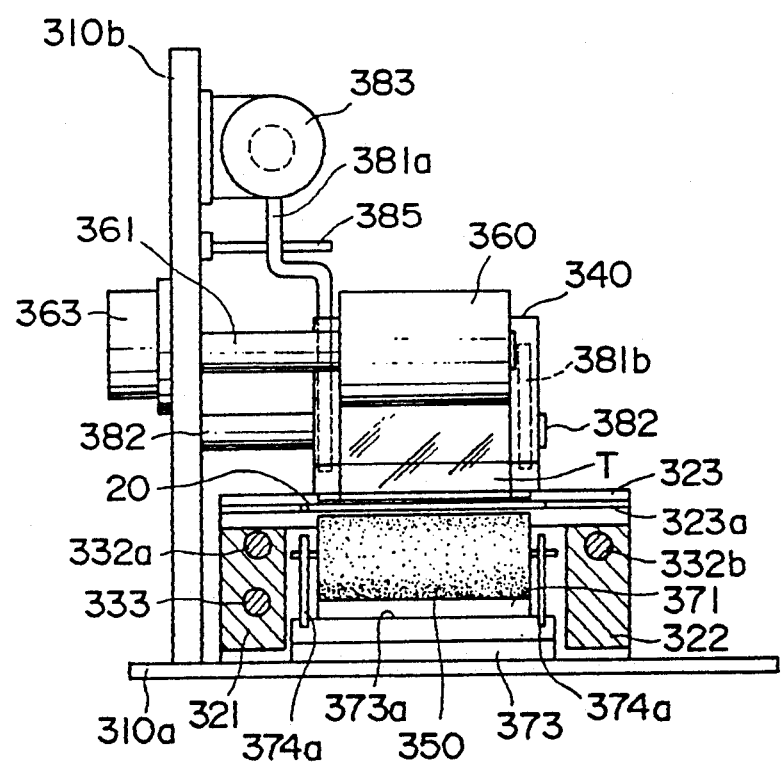
FIG. 15 is an illustration showing the arrangement of the side of the printer of FIG. 14.

FIG. 14 schematically shows another embodiment of the printers of apparatus 10 in the form of printer 300 which comprises: a housing 310; a stage 320 as card holding means for holding a card 20 of plastics for recording information therein; a transport device 330 for transporting the stage 320 in a predetermined direction; a thermal head 340 for recording information on the surface of the card 20 in the form of e.g. letters or figures; a platen roller 350 as card supporting means for supporting the backside of the card 20 being transported; a reel 360 on which a thermal ribbon T is wound, which ribbon is applied onto the thermal head 340; and driving devices 370, 380 (drive means) for vertically moving the thermal head 340 and the platen roller 350 toward and away from each other.

The housing 310 comprises: a base plate 310a which extends horizontally; and a backplate 310b standing vertically upwardly from the base plate 310a.

The base plate 310a is provided with a transport device 330 for transporting the stage 320 and the driving device 370 for vertically moving the platen roller 350. The backplate 310b is provided with the driving device 380 for vertically moving the thermal head 340.

The transport device 330 is formed by bearing plates 331a and 331b standing on the base plate 310a, guide shafts 332a and 332b mounted between the bearing plates 331a and 331b, a feed screw 333, and a step motor 334 connected to an end of the feed screw 333. The stage 320 is mounted on the guide shafts 332a and 332b and feed screw 333. To the step motor 334, there is connected a controller 390, which provides a control signal concerning the speed and direction of the rotation of the step motor 334 and which receives information concerning the speed and direction of the rotation of the step motor 334.

Figure 16:
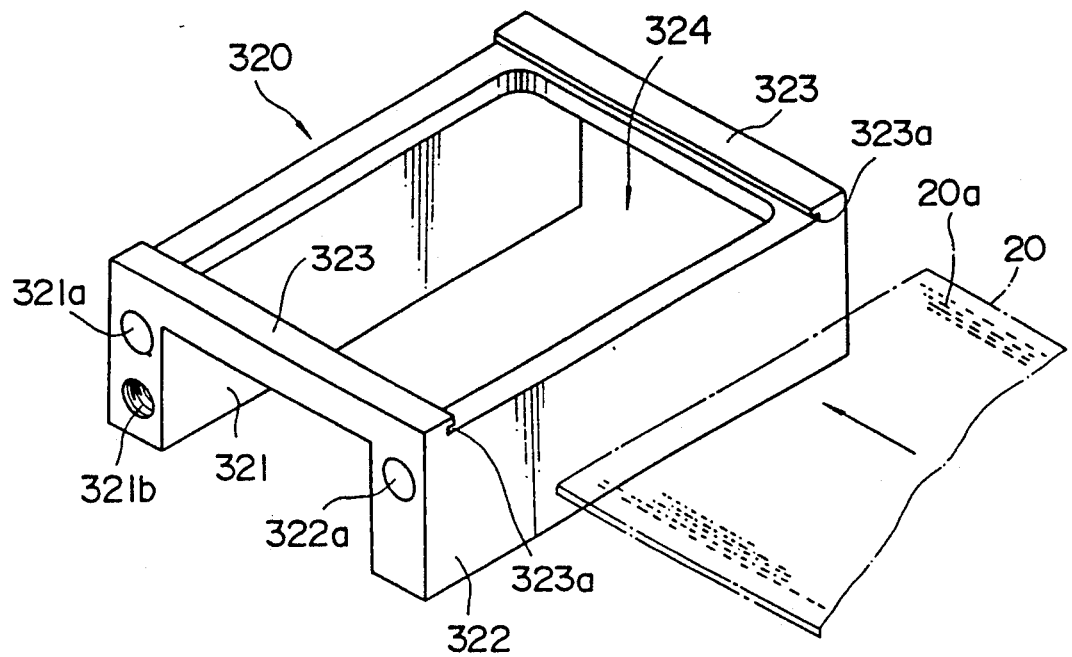
FIG. 16 is a schematic perspective view of the card mount of the printer of FIG. 14.

As shown in FIG. 16, the stage 320 has a pair of vertical wall portions 321 and 322, and a transverse shaft portions 323 which interconnect upper ends of the vertical wall portions 321 and 322 of the pair, with a space 324 being provided between the vertical wall portions 321 and 322 and the transverse shaft portions 323. The vertical wall portions 321 and 322 extend in the direction of transport; in one vertical wall 321 which is situated adjacent to the backplate 310b, an insertion bore 321a for insertion therethrough of the guide shaft 332a, and a threaded bore 321b for engagement with the feed screw 333 are opened. The vertical wall portion 322 opposite to the vertical wall portion 321 has opened therein an insertion bore 322a for insertion therethrough of the guide shaft 332b. The transverse shaft portions 323 are formed such as to extend perpendicularly to the direction in which the stage 320 is transported. In the surfaces of the transverse shaft portions 323 which are opposite to each other, grooves 323a are cut for holding the card 20 by the leading and trailing edges, i.e. the forward and rearward ends as seen in the direction of transport. The card 20 is automatically inserted into the grooves 323a by e.g. transport rollers in a direction perpendicular to the direction in which the stage 320 is transported. In this embodiment, displacement in the direction of transport of the stage 320 can be avoided since the leading and trailing edges of the card 20 abut against the bottom walls of the grooves 323a when the card 20 is held by its leading and trailing edges. Alternatively, the card 20 may naturally be held by one or both of its lateral ends as seen in the direction of transport. In the case in which the card 20 is held by both of its lateral ends as seen in the transport direction, grasping means may be provided which immovably grasp the card 20 by both of the lateral ends thereof when the card 20 is mounted on the stage 320, or stepped segments into which the periperal portions of the card 20 can fit may also be provided along the peripheral portions of the stage 320 which difine the space 324.

The driving device 370 for vertically moving the platen roller 350 is formed by: a mounting plate 371 projecting from the base plate 310a; a solenoid 372 likewise mounted on the base plate 310a; a slider 373 slidable on the base plate 310a; arms 374 pivoted to both sides of the mounting plate at an upper portion thereof for rotatably holding the ends of the platen roller 350; and a spring 375 interconnecting an intermediate portion of the mounting plate 371 and the slider 373.

The mounting plate 371 has a width which is selected such that it can be placed between the vertical wall portions 321 and 322 of the stage 320 so as not to interfere with the transport region of the stage 320, and a height which is selected such that the transverse shaft portions 323 will not touch the upper end of the platen roller 350. The platen roller 350 can pass into and out of the space 324 defined by the vertical wall portions 321 and 322 and the transverse shaft portions 323.

The solenoid 372 is adapted to operate in accordance with a control signal which is output from a controller 390 of the step motor 334. That is, the controller 390 will calculate the current position of the space 324 within the stage 320, on the basis of e.g. the speed and direction of rotation of the step motor 334, the pitch of the feed screw 333, a preset initiation-of-travel reference position of the stage 320, and the position of the facing wall surfaces of the transverse shaft portions 323 of the stage 320, and it will compare the result of the calculation with the position of the rotation axis 350a of the platen roller 350. As a result of this comparison, a control signal is delivered to the solenoid 372 immediately before an arrival of the initiation-of-printing position of the card 20 at a place directly over the rotation axis 350a, whereby the solenoid 372 will pull the slider 373 into sliding movement on the base plate 310a.

The slider 373 serves as a motive cam for vertically moving the platen roller 350; it has a form which is lower at the end facing toward the solenoid 372 and higher at the end facing toward the mounting plate 371; its higher portion 373a forms a flat surface which is parallel to the base plate 310a.

The arms 374 serve as driven cams engaging with the slider for vertically moving the platen roller 350. Their portions situated below the mounting shaft 350a for supporting the platen roller 350 have cam portions 374a formed thereon which project toward the slider 373. As the slider 373 is moved toward the solenoid 372 by the action of the solenoid 372, the arms 374 are raised to lift up the platen roller 350, whereby the platen roller 350 will abut against the card 20.

The thermal head 340, which is for recording information on the card 20, comprises a plate-shaped member having a great number of dot-shaped exothermic elements of minute surface area arranged in a linear array at the lower end thereof. The exo-thermic elements will give off heat in response to a control signal from the controller, whereby e.g. a dye is transferred from the thermal ribbon T of the heat transfer type (see FIG. 17) to the surface of the card 20. This thermal head 340 is fixed to arms 381a and 381b of the driving device 380.

The driving device 380 is formed by said arms 381a and 381b, a mounting shaft 382, a solenoid 383, and a spring 384. The arms 381a and 381b are pivotably mounted on the mounting shaft 382 which projects from the backplate 310b. A portion of the arm 381a arranged closer to the backplate 310b, adjacent to the fixing portion of the thermal head 340, has a curved recess facing toward the base plate 310a so as not to interfere with the mounting shaft 361 of the reel 360 on which the thermal ribbon T is wound up (see FIG. 14). At a portion adjacent to the pivoting portion of the mounting shaft 382, the rear end of the arm 381a is bent upward to form essentially an "L" and is connected to a spring 383a which extends from the solenoid 383 which is provided on the backplate 310b. To the rear end of the arm 381a, there is connected the spring 384 which urges the rear end of the arm 381a against the pulling force of the solenoid 383. An end of the spring 384 is fixed to the back-plate 310b. This spring 384 normally acts to place the thermal head 340 in an elevated position. Mountig shafts 361 for pivotably mounting the reels 360 for taking up the thermal ribbon T, as well as a stopper shaft 385 for limiting the region of movement of the rear end of the arm 381a, project from the backplate 310b. One end of the arm 381b is fixed to the thermal head 340, and the other end of the arm 381b is pivotably mounted on the mounting shaft 382.

Figure 17:
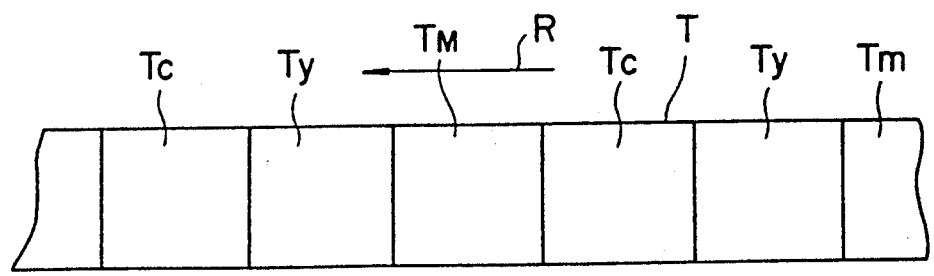
FIG. 17 is an illustration showing the plan arrangement of a thermal ribbon for use in the printer of FIG. 14.

The solenoid 383 is driven in response to a control signal E from the controller 390. The controller 390 calculates the distance of transport of the card 20 on the basis of the amount of rotation of the step motor 334 and the pitch of the feed screw 333 and calculates, based on such transport distance, information of the position of a printing portion (information recording portion) for effecting printing on the card 20. When the control signal E has been delivered from the controller 390 to the solenoid 383 on the basis of this position information, the solenoid 383 will pull the rear end of the arm 381a against the urging force of the spring 384, thereby to lower the thermal head 340 toward the card 20. When the thermal head 340 descends and the card 20 is sandwiched via the thermal ribbon T, a control signal F to give off heat is delivered to the thermal head 340, whereby the dye is transferred from the thermal ribbon 40 to the printing portion of the card 20. In this embodiment, the thermal ribbon T bears three colors, yellow, magenta, and cyan arranged thereon, as shown in FIG. 17, so that multiple color printing can be effected on the surface of the card 20. The mounting shaft 361, mounted to project from the backplate 310b, is rotated by a step motor 363 which is provided on the backside of the backplate 310b.

Next, the operation of this embodiment of the card producing apparatus will be described.

First, the stage 320 is in the lefthand side in FIG. 14 before the initiation of printing on the card 20. The then position of the stage 320 is the ready-to-print position. When the stage 320 is in the ready-to-print position, the card 20 is inserted in the direction in which the grooves 323a in the stage 320 extend. The ready-to-print position of the stage 320 is set in the controller 390 as the reference position for the calculation of the amount of rotation of the step motor 334.

When the card 20 has been inserted into the stage 320, a control signal A to rotate the step motor 334 is delivered from the controller 390 to the step motor 334. In response to this control signal A, the step motor 334 will rotate to transport the stage 320 in such a manner that the initiation-of-printing portion of the card 20 will be placed over the upper end of the platen roller 350. Information concerning the amount of transport of the stage 320 as determined by calculation from the amount of rotation of the step motor 334 and the pitch of the feed screw 333, is delivered as an information signal B to the controller 390. Since a reference amount of rotation of the step motor 334 at the moment when the initiation-of-printing position 20a of the card 20 is situated over the upper end of the platen roller 350 is set in the controller 390, the transmission of the control signal A is terminated when the amount of rotation of the step motor 334 has reached the reference amount of rotation.

After transport of the stage 320, a control signal C to initiate rotation for a no-load feed of the thermal ribbon T is delivered from the controller 390 to the step motor 363 to rotate the reels 360, whereby the start position of the yellow Ty, for example, of the thermal ribbon T is fed to the thermal head 340. An information signal C', concerning the amount of rotation of the step motor 363, is transmitted from the step motor 363 to the controller 390, where it is compared with information as to the arrangement of colors on the thermal ribbon T as stored in the controller 390. When the start position of the yellow Ty has been positioned at the thermal head 340 as a result of the comparison operation of the controller 390, solenoid 83 is operated to make the thermal head 340 abut against the platen roller 350 via the thermal ribbon T and, in this embodiment, a control signal D to keep the platen roller 350 in the elevated position is delivered from the controller 390 to the solenoid 372 while the reels 360 are rotating. This control signal D for the elevation of the platen roller 350 may be allowed to last until the completion of the printing on the card 20, or, alternatively, the platen roller 350 may be raised and lowered each time the color of the thermal ribbon T is changed; in this embodiment, however, the output of the control signal D to the solenoid 372 is continued until the completion of the printing on the card 20.

After the platen roller 350 has been raised in accordance with the control signal transmitted to the solenoid 372, the control signal E is delivered from the controller 390 to the solenoid 383. In accordance with this control signal E, the solenoid 383 is operated to attract the rear end of the arm 381a toward the solenoid 383 against the urging force of the spring 384. As a result, the thermal head 340 and the platen roller 350 will hold the card 20 between them with the thermal ribbon T sandwiched.

While the card 20 is held, the control signal F to cause the exothermic elements on the forward end of the thermal head 340 to give off heat is intermittenly provided from the controller 390 to the thermal head 340 so as to thermally transfer the yellow dye from the thermal ribbon T to each line in the printing portion of the card 20. Then, the platen roller 350, abutting against the card 20, will rotate as the stage 320 is transported. As the stage 320 is moved forward by the step motor 330, the reels 360 will rotate in synchronism therewith, with the thermal ribbon T being pressed against the card 20 by the pressing force exerted by the thermal head 340. As the card 20 and the thermal ribbon T are moved forward simultaneously, the exothermic elements of the thermal head 340 are controlled to effect printing each line on the surface of the card 20. The pressing action of the thermal head 340 against the card 200 is continued until completion of printing in yellow in the case of the card 200 to be printed in yellow, for example. The exothermic elements of the thermal head 340 are controlled such that the printing in yellow of the card 200 is completed while the yellow dye portion of the thermal ribbon T is running.

Upon completion of the printing yellow, the operation of the solenoid 383 is terminated. As a result, the urging force of the spring 384 will attract the rear end of the arm 381a toward the stopper 385 and the thermal head 340 is lifted over the card 20 together with the thermal ribbon T.

After the completion of printing in yellow on the surface of the card 20, and after the termination of operation of the solenoid 383, the control signal C is transmitted from the controller 390 to the step motor 362, whereby the step motor 362 is rotated to place a magenta portion Tm, the next transfer color, of the thermal ribbon T at the lower end of the thermal head 340.

Next, the control signal A is transmitted to the step motor 334 so as to rotate the step motor 334, whereby the stage 320 is transported such that an initiation-of-printing-in-magenta position of the card 20 is placed at the upper end of the platen roller 350. Subsequently, the step motor 334, the step motor 362, the solenoid 383, and the thermal head 340 are controlled in the same manner as they are controlled to effect printing in yellow Ty, until the thermal transfer of cyan, the third transfer color, is completed.

After the completion of printing on the card 20, the drive signal D to the solenoid 372 is terminated to stop the operation of the solenoid 372, and the slider 373 is caused to slide toward the mounting plate 373 by the urging force of the spring 375. The cam portions 374a of the arms 374 will thereby be shifted to the lower portion of the slider 373 and the supporting action of the platen roller 350 to the backside of the card 20 is removed. Next, the step motor 334 is rotate to move the stage to the ready-to-print position. When the next plastics card has been mounted and a begin-to-print control signal is again transmitted to the step motor and other elements, printing is initiated to the next plastics card.

In this embodiment of the card producing apparatus 10, since the leading and trailing edges, as seen in the direction of transport, of the card 20 are held in the grooves 323a and transported together with the stage 20, the card 20 will not cause any displacement in color arrangement of printing in the forward or rearward sense of transport. In addition, since the backside of the card 20 is supported by the platen roller 350 and since the thermal head 340 is lowered from above the platen roller 350 so as to hold the card 201 therebetween via the thermal ribbon T, the exothermic elements of the thermal head 340 will press against the card uniformly, whereby nonuni-formity will not take place in the printing. It is therefore possible to greatly improve the quality of printing of the card 20. Further, since the stage 320 is hollow, the mechanism for the feed and discharge of the card 20 can be easily mounted. In addition, the stage 320 itself will not bear the pressing force from the thermal head 340, it is possible to render smaller and lighter the step motor 334 for transporting the stage 320.

Figure 18:
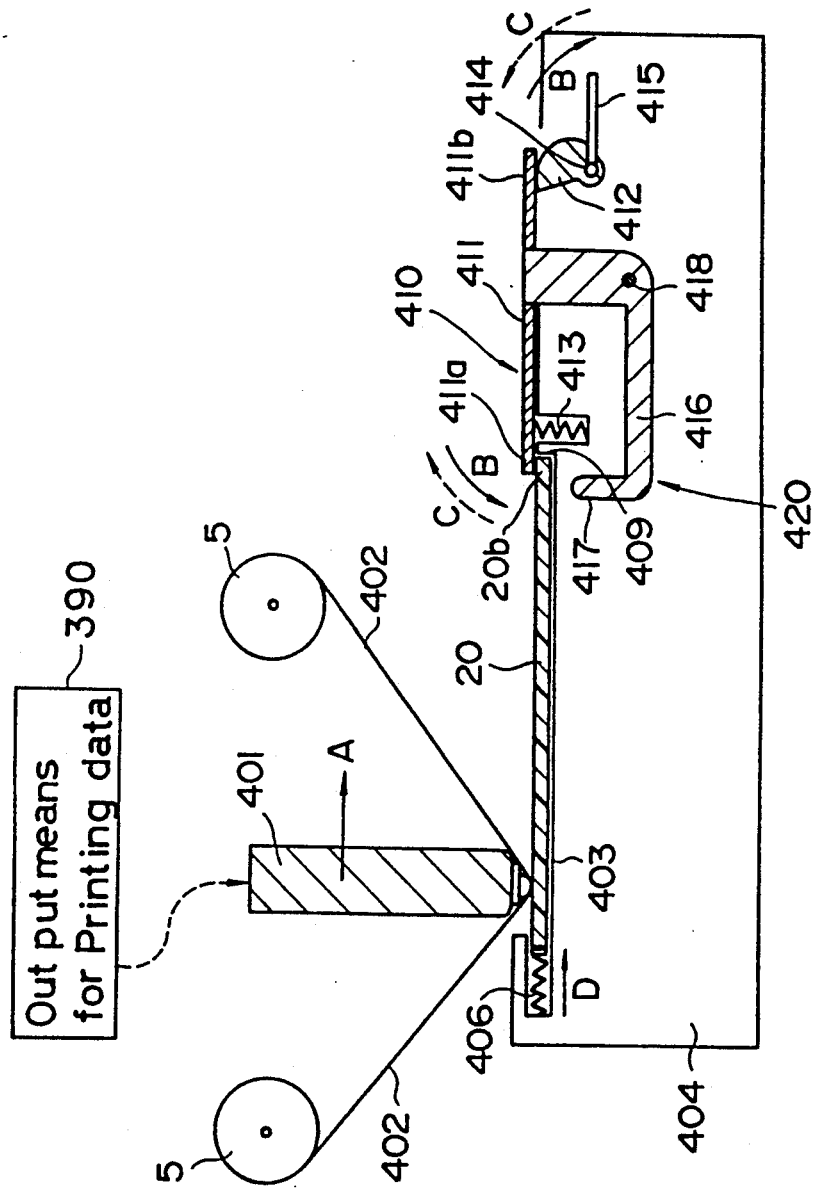
FIG. 18 is a schematic illustration of the printer of the embodiment according to claim 8 of the present invention.

In FIG. 18, shows another embodiment of the printer of apparatus 10 in the form of printer 400, wherein the card 20 is mounted on a slide stage 404 on the upper surface of the slide stage 404, there is provided a card holding recess 403 for mounting the card 20 therein. The stage 404 is movable from the left to the right in the figure. A resilient member 406 is provided at the forward end, as seen in the direction of movement, of the card holding recess 403, and a stopper 409 is provided at the rearward end, as seen in the direction of movement, of the slide stage 404. The resilient member 406 urges the card 20 toward the stopper 409. A thermal ribbon 402 is applied over the card 20, and a thermal head 401 abuts against the thermal ribbon 402 from above. The resilient member 406 is formed by a spring which has one end thereof attached to the slide stage 404, and has the other end thereof attached to a card supporting piece. In the neighborhood of the stopper 409, there is provided card pressing means 410 for pressing the trailing edge of the card 20 against the top surface of the slide stage 404, together with card push-up means 420 for removing the card from the top surface of the slide stage 404.

The card pressing means 410 is formed by a plate 411 which presses the trailing edge 20b of the card 20, and an eccentric cam 412. On a portion of the slide stage 404 which is situated behind the stopper 409, there is provided a spring 413 for urging the leading edge 411a of the plate 411 away from the slide stage 404. The eccentric cam 412 is formed like a semicircle, with a rotation axis 414 being provided adjacent to one end of the chord forming part of the semicircle. The rotation axis 414 is supported on the slide stage 404. On this rotation axis 414, there is provided a lever 415 for rotating the eccentric cam 412. By operating the lever 415, the eccentric cam 412 can be rotated to push up the trailing edge 20b of the card 20. The opposite end of the chord of the eccentric cam 412 supports the plate 411. The plate 411 has a substantially L-shaped arm 416 formed at an intermediate portion of the lower surface thereof, which arm extends toward the interior of the slide stage 404. A bent portion of this arm 416 is pivotably mounted to the slide stage 404, whereby the plate 411 is pivotable. The card push-up means 420 is formed by the spring 413, an arm 420 of the plate 411, and the eccentric cam 412, with a pin 417 projecting upward from the forward end of the arm 420 of the plate 411, which pin is adapted for vertical movement within the slide stage 404 to push up the backside of the trailing edge 20b of the card 20. The card pressing means 410 and the card push-up means 420 are associated with each other by means of the arm 416 provided integral with the plate 410, the pin 417 formed on the arm 416, and a pivot pin 418 for the rotation of the arm 416, change is made between the card pressing means 410 and the card push-up means 420 by the rotation of the eccentric cam 412.

Next, fixing and removal of the card 20 in the printer 400 of this embodiment will be described.

When the card 20 has been positioned over the card holding recess 403 by transport means not shown, the operation lever 415 is operated by an actuator not shown so as to rotate the eccentric cam 412. The card 20 is pressed forwardly by making the leading edge 20b of the card 20 abut against the resilient member 406, and the card 20 is thus mounted on the upper surface of the slide stage 404. The card 20 mounted on the upper surface of the slide stage 404 is pressed against the stopper 409 by the urging force of the resilient member 406, and held within the card holding recess 403. When the trailing edge 20b of the card 20 has been fixed at the stopper 409, the operation lever 415 is again operated by the actuator to rotate the eccentric cam 412 in the reversed direction, whereby the trailing edge 20b of the card 20 is pressed against the upper surface of the slide stage 404 by the forward end 411a of the plate 411. When the card 20 has been fixed to the slide stage 404, the slide stage 404 and the thermal ribbon 402 are driven and the thermal head 401 is controlled for heating for effecting transfer onto the printing surface of the card 20. After the completion of transfer, the eccentric cam 412 is again rotated by the actuator, whereby the forward end 411a of the plate 411 is moved away from the trailing edge 20b of the card 20 by the urging force of the spring 413 and the backside of the card 20 is pushed up by the pin 417 of the arm 416. The card 20 is thereby disengaged from the stopper 409 and removed from the slide stage 404 while being held by card holding means not shown (e.g., chuck means). When the slide stage 404 approaches the thermal head 401, the thermal head 401 is situated in a higher position so as not to obstruct the movement of the slide stage 404. Further, when the printing portion of the card 20 has come near, the thermal head 401 is lowered for effecting thermal transfer and, after the completion of printing, the thermal head 401 is again elevated to permit the stage 404 to be moved.

Figure 19:
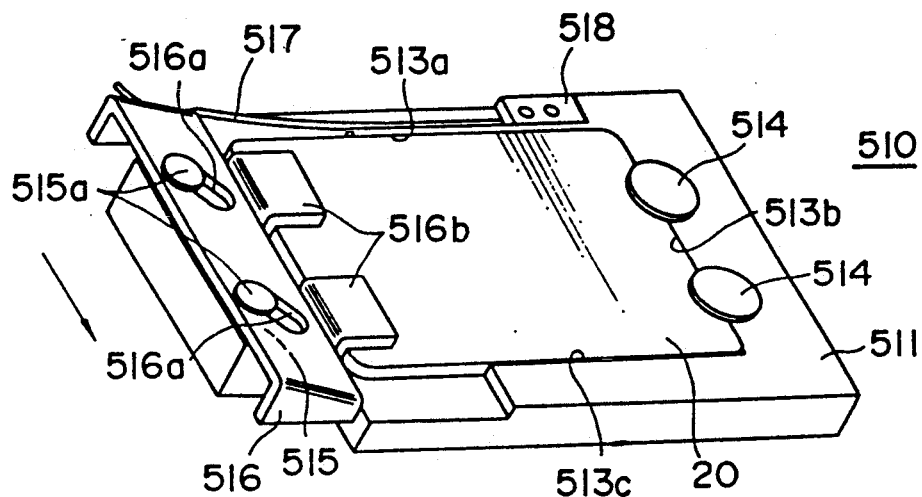
FIG. 19 is a schematic perspective view of the card supporting means of the embodiment according to claim 9 of the present invention.
Figure 20:
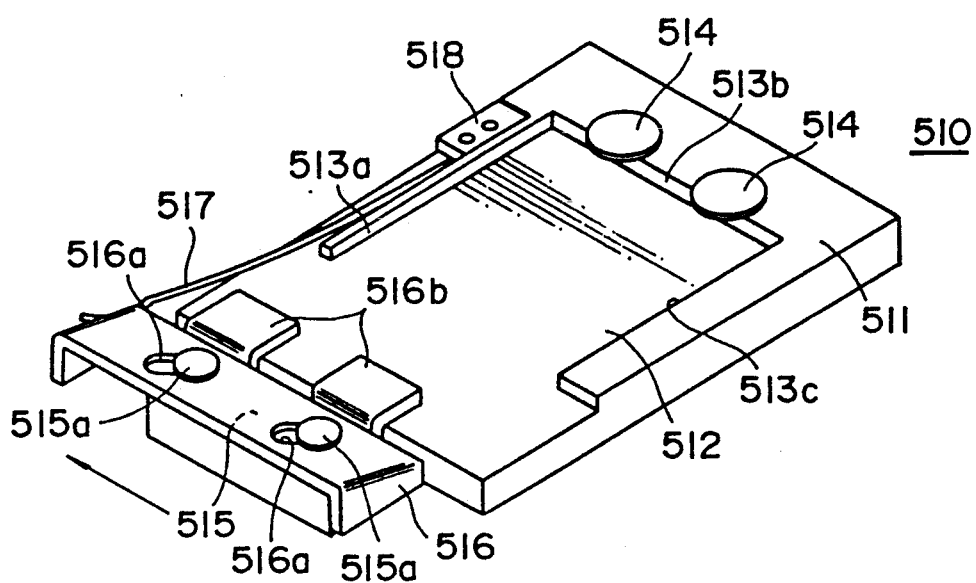
FIG. 20 is a perspective view in which a card is held by the card supporting means of FIG. 19.

FIGS. 19 and 20 show another embodiment of the printer 300, in which a rectangular, sunken support surface 513c for mounting a card 20 therein is formed in a card fixing device 510 for fixing the card 20. Between the card 20 and a thermal head, there is spanned a thermal ribbon which enables printing.

FIGS. 19 and 20 show only the card fixing device 510. In FIG. 19, the card is mounted; in FIG. 20, the card is not mounted. As shown in FIG. 20, the card fixing device 510 has a slide stage 511 which has a support surface 512 formed substantially at the center thereof for bearing the card 20 whose one side abuts on such surface. Around the support surface 512, positioning means 513a, 513b and 513c is provided for positioning three sides of the card 20. Though the positioning means 513a, 513b and 513c is not required to be in contact with the whole of one side of the card 20, the support surface 512 is here such that the surface of the slide stage 511 is cut into to a degree corresponding to or somewhat smaller than the thickness of the card 20. Catching means 514 for preventing the card 20 from rising from the support surface 512 is provided on the central one of the three sides positioned by the positioning means 513a, 513b and 513c, here the place corresponding to the positioning means 513b. At the position of such catching means 514 which faces toward the support surface 512, the card 20 to be printed is automatically and securely inserted by chuck means in such a manner that it cannot move in the direction of thickness. At a position opposite to the catching means 514, an inclined surface 515 is provided outside the support surface 512. Here, the inclined surface 515 is lower at one end adjacent to the support surface 512, and it becomes higher with the distance from there; alternatively, it may be such that one side adjacent to one of the positioning means 513a or 513c is higher and the opposite side lower (the side for insertion or removal of the card).

In this inclined surface 515, card restraining means 516 is movable between higher and lower positions. In the position of the card restraining means 516 which abuts against the inclined surface, two parallel slots 516a are provided at an angle relative to the direction of inclination. Guide pins 515a implanted in the inclined surface 515 engage in the slots 516a. Inverted-"L"-shaped card abutments 516b, formed on one side of the card restraining means 516 which faces toward the catching means 514, are adapted to push, at a rising face thereof, the end of the card 20 against the positioning means 513b situated adjacent to the catching means 514 while pressing, at an extending face thereof, the card 20 onto the support surface 512 so as to render the card 20 immovable.

On one side of the slide stage 511 adjacent to the positioning means 513a, a spring 517 formed by a wire or plate of steel has one end thereof fixed by a presser metal fitting 518, and the other, free end thereof in contact with the card restraining means 516. The card restraining means 516 is continuously urged by the spring 517 in the direction of an arrow in FIG. 19, i.e. in the direction in which the card restraining means 516 is moved toward the catching means 514 so as to fix the card 20. The means for providing such urging force is not limited to the spring 517 used in this embodiment; for example, a coil spring may naturally be used which may be arranged in the inclined surface 515 or in other locations. Next, the operation will be described.

As shown in FIG. 20, the card restraining means 516 is pressed in the direction of the arrow against the urging force of the spring 517, and it is held in a position at which the guide pins 515a abut against ends of the slots 516a. Under such conditions, the card abutments 516b are sufficiently spaced away from the support surface 512 to insert the card 20, and the card 20 is inserted into position by making the card 20 abut against the position means 513a, 513b and 513c and be located under the catching means 514. Subsequently, the force applied to the card restraining means 516 in the direction of the arrow in FIG. 20 is removed and, consequently, the card restraining means 516 is pressed by the urging force of the spring 517 in the direction indicated by the arrow in FIG. 19, with the result that it moves down the inclined surface 515, whereby the card abutments 516b press the end surface of the card 20 against the positioning means 513b adjacent to the catching means 514 and further press the card 20 against the support surface 512. Consequently, the card 20 can be securely fixed to the slide stage 511 without any rise or play, as shown in FIGS. 19.

It is moved into a location under the thermal head, where the card 20 is printed by the thermal head with the thermal ribbon situated therebetween. Then, it can be reciprocated at a high speed since the card fixing device 510 has a compact and light-weight structure which has a small inertial force. Because of the small inertial force, it can move without generating vibration even when it is started or stopped, whereby dots can be accurately struck and, hence, color displacement or bleeding will hardly occur even in the case of color printing. After the completion of the printing, the card restraining means 516 is automatically moved by e.g. catching means and the printed card 20 is removed.

Figure 21:
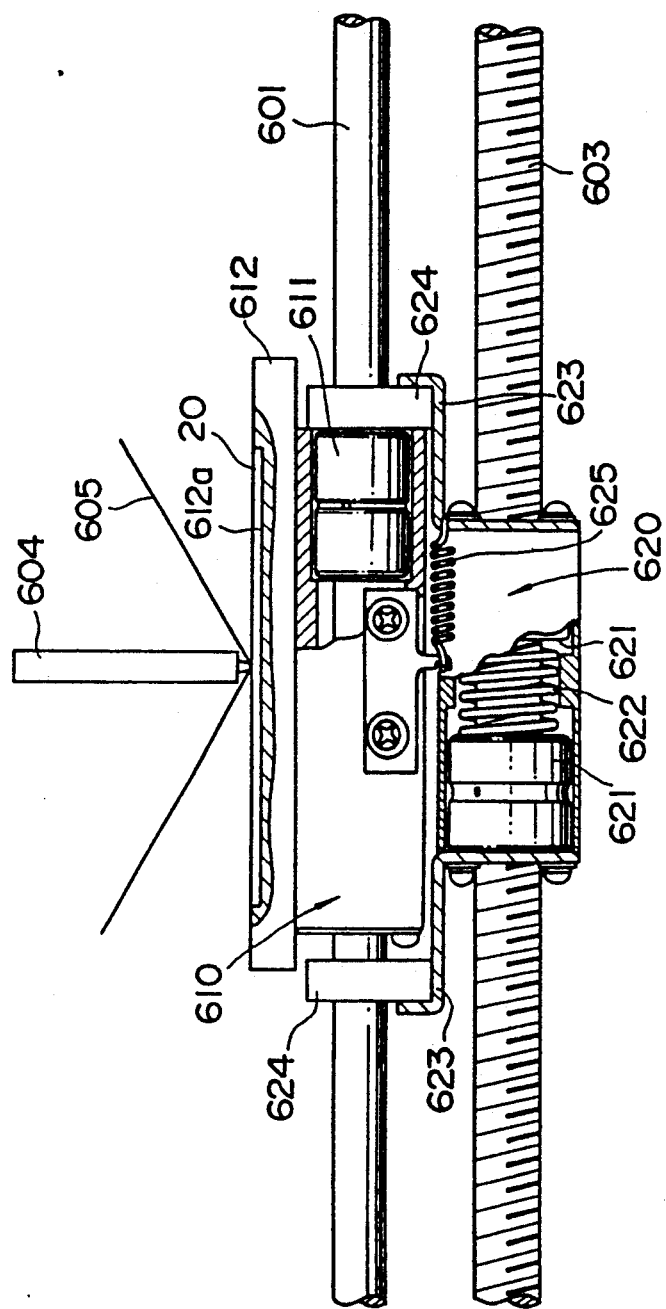
FIG. 21 is a sectional view schematically showing the arrangement of the printer of the embodiment according to claim 10 of the present invention.

FIG. 21 shows the printer another embodiment of apparatus 10.

In the figure, 601 are at least two guide bars; here two guide bars 601 are arranged parallel to each other. A feed screw 603, which can be rotated by a pulse motor not shown, is arranged parallel to the two guide bars 601. The guide bars 601 are formed from a round bar of high straightness, and the feed screw 603 has a screw thread of accurate constant pitch formed therearound.

A linear bush casing 610 is axially slidable along the two guide bars 601 without rotation about the axis, while a nut casing 620 is axially movable along the feed screw 603.

At least one, here two, linear bushes 611, slidably mounted on each of the guide bars 601, are fixed to the linear bush casing 610 with a spacing therebetween, four linear bushes 611 are connected together to form a single body. To this linear bush casing 610, a slide stage 612 is fixed on the side opposite to the feed screw 603. In a recess 612a in the slide stage 612, a card 20 is fixedly held by some means, such as suction means or mechanical means (not shown), in such a manner that it has a surface parallel to the plane which is formed by the two guide bars 601. Over the slide stage 612, a thermal head 604 extending perpendicularly to the plane of the card 20 is provided, with a thermal ribbon 605 being arranged between the thermal head 604 and the card 20.

In the nut casing 620, two nuts 621 are provided which are screwed onto the feed screw 603 and which are capable of fine movement. These nuts are accommodated such that their axially outward end faces are born, with a first spring in the form of a coil spring 622 being provided between these nuts 621 for urging them away from each other. On both sides, axially of the feed screw 603, of the nut casing 620, there are provided two arms 623 which receive the linear bush casing 610 there between and which extend as far as the axially opposite sides of the linear bush casing 610. To the free end of each of these arms 623, a claw member 624, either integral with or separate from the arm 623 (in this embodiment, it is a separate member), having U-shaped cuts receiving therein the guide bars 601 is fastened. These claw members 624 will prevent the nut casing 620 from rotating about the feed screw 603.

Between the nut casing 620 and the linear bush casing 610, a second spring 625 is provided which continuously urges the linear bush casing 610 in such a manner that one axial end face of the linear bush casing 610 abuts against one of the claw members 624 of the set on both ends of the arms 623.

Next, the operation will be described.

During a stay, the two nuts 621 are pressed in opposite directions by the expanding force of the first spring 622 without play, and will not move. If, then, the pulse motor outside the drawing figure is actuated in accordance with an actuating command to the pulse motor, the feed screw 603 will thereby be rotated, absorbing the collision at the start of the rotation and slightly compressing the spring 622 against the expanding force of the spring 622. Then, the nuts 621 in the nut casing 620 will also receive a rotating power about the axis and, consequently, the nuts 621 will move in the axial direction, and therefore the nut casing 620 will move in the axial direction since the nuts 621 are fixed to the nut casing 620 which engages with the guide bars 601 through the claw members 624 on the free ends of the arms 623 in such a manner that the nut casing 624 cannot rotate. For example, when moved leftward in FIG. 21, the claw member 624 on the right-hand side will push and move the linear bush casing 610 toward the left. Even if the straightness of the feed screw 603 should be somewhat bad, or if the feed screw 603 should be somewhat swerved from the center axis and oscillate about due to the shock of start, strong forces would not be transmitted because the nut casing 620 and the linear bush casing 610 do not completely form an integral body but are interconnected by means of the second spring 625, and the feed screw 603 will run off before the guide bars 601 are bent, and, naturally, the linear bush cansing 610 will not affect the slide stage 612. Therefore, the thermal head 604 can effect printing exactly at the predetermined position on the ther ribbon 605. Printing is effected at a high speed in a manner in which the advance of the slide stage 612 and the printing operation of the thermal head 604 are effected in synchronism.

Figure 22:
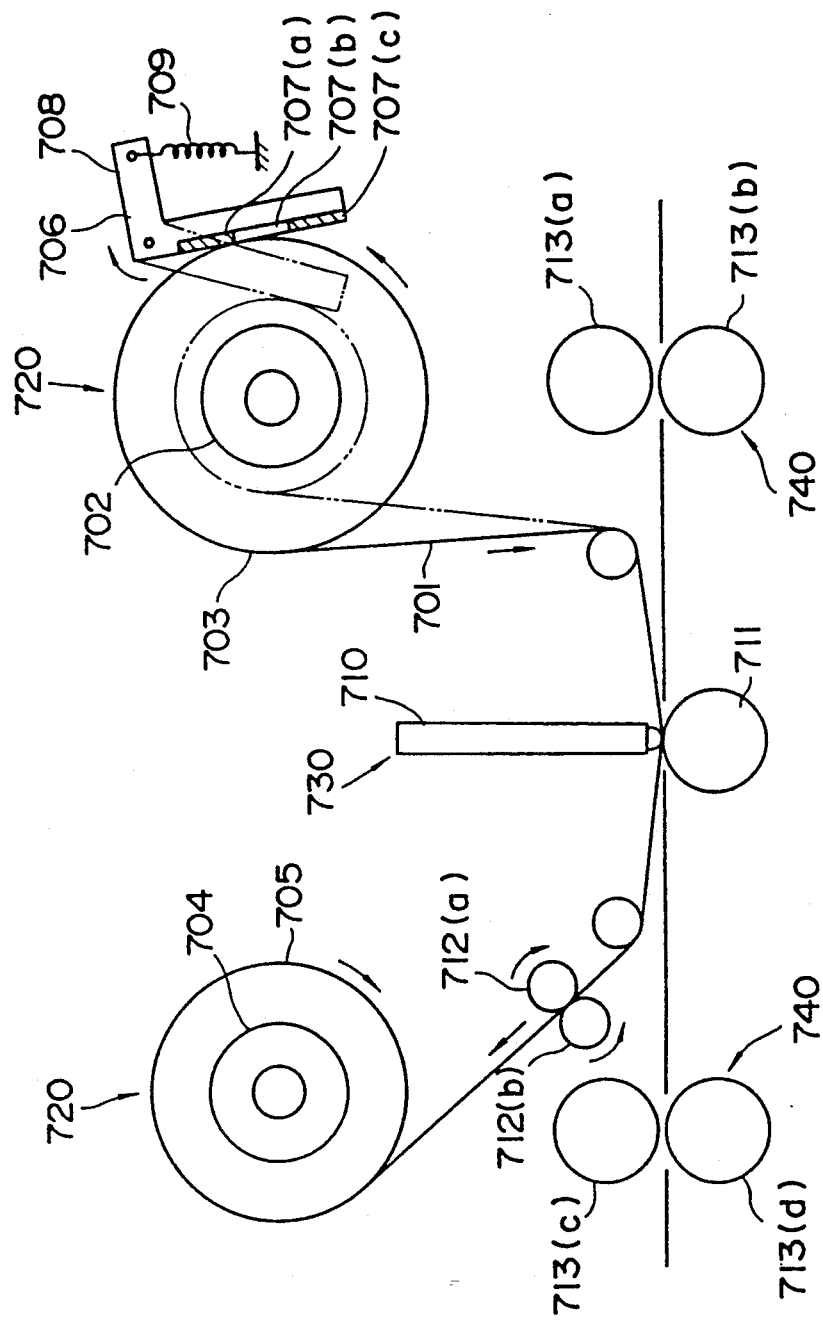
FIG. 22 is an illustration showing the arrangement of the thermal ribbon feeding section of the embodiment according to claim 11 of the present invention.

FIG. 22 is an illustration of another embodiment of the printer of apparatus 10 in one form of the thermal printer 700. This thermal printer 700 comprises a thermal ribbon supply section 720, a printing section 730, and a card transport mechanism 740 for transporting a card 20 which is the object to be printed.

The thermal ribbon supplying section 720 essentially comprises: a thermal ribbon feed section 703 in which a thermal ribbon 703 is wound in a roll form on a feed drum 702, and a take-up section 705 comprising a take-up drum 704 on which the used thermal ribbon 701 is taken up.

The printing section 730 includes: a thermal head 710 which is arranged between the thermal ribbon supply section 703 of the thermal ribbon supply section 720 and the take-up section 705 for melting the ink on the thermal ribbon 701 and transferring it to the card 20; and a platen roller 711 which is adapted to be in contact with the card 20 for supporting it against the pressure exerted from the thermal head 710 during printing.

The card transport mechanism 740 comprises two sets of transport rollers 713a, 713b, 713c and 713d before and after the printing section 730, respectively, which rollers are driven by a driving device not shown, and will receive a driving power from the driving device not shown for transporting the card while grasping it.

In the thermal ribbon supply section 720, a presser member 706 of aluminum is provided. This presser member 706 is L-shaped with a long limb 707 and a short limb 708 extending essentially at right angles. A spring 709 fastened to a frame not shown is connected in a stretched state to one end of the short limb 708, and the folded portion between the long limb 707 and the short limb 708 is pivoted to the frame. The long limb 707 is formed with a bent piece member which is opposite to the thermal ribbon supply section 703. On this bent piece member, friction surfaces 707a, 707b and 707c of different coefficients of friction are formed. The friction coefficient $\mu$ of the friction surface 707a is set to 0.2; the friction coefficient $\mu$ of the friction surface 707b is set to 0.3; and the friction coefficient $\mu$ of the friction surface 707c is set to 0.4. The long limb 707 is urged by the pulling force of the spring 709 such as to be continuously in contact with the thermal ribbon supply section 703 to press against the thermal ribbon 701. Thus, the friction surface 707a of the long limb 707 which has the lower friction coefficient value is in contact with the thermal ribbon 701 when a larger amount of the thermal ribbon 701 remains on the thermal ribbon supply section 720; as the remaining amount of the thermal ribbon 701 is reduced, the long limb 707 is shifted toward the thermal ribbon 701 and, consequently, the friction surface 707c of higher friction coefficient value is brought into contact with the thermal ribbon 701. When the remaining amount of the thermal ribbon 701 is large, the spring 709 exerts a large pulling force, providing a large frictional resistance between the friction surface 707a and the thermal ribbon 701, while, when the remaining amount of the thermal ribbon 701 is small, the spring 709 exerts a weaker pulling force but the friction surface 707c providing a larger frictional resistance presses against the thermal ribbon 701, with the result that a constant back tension can be applied to the thermal ribbon 701.

Specifically, when the remaining amount of the thermal ribbon 701 is large and the friction surface 707c of the presser member 706 is in contact with the thermal ribbon 701, the pressingforce is from 120 to 90 (gf) and the back tension is calculated at a value of from 24 to 18 (gf) from $F=\mu N$. As the contact point between the presser member 706 and the thermal ribbon 701 moves gradually to the friction surfaces 707b and 707c, the pressing force will be 60–40 (gf) and the back tension will be 24–16 (gf). Thus, the change of the back tension due to the change of the remaining amount of the thermal ribbon 701 can be limited to 27-16 (gf).

Figure 24:
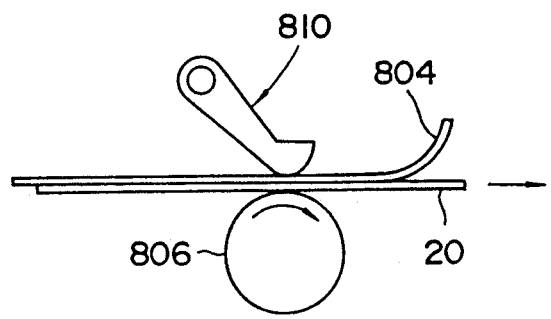
FIG. 24 is an illustration in which the thermal head of FIG. 23 is in a transferring position.
Figure 25:
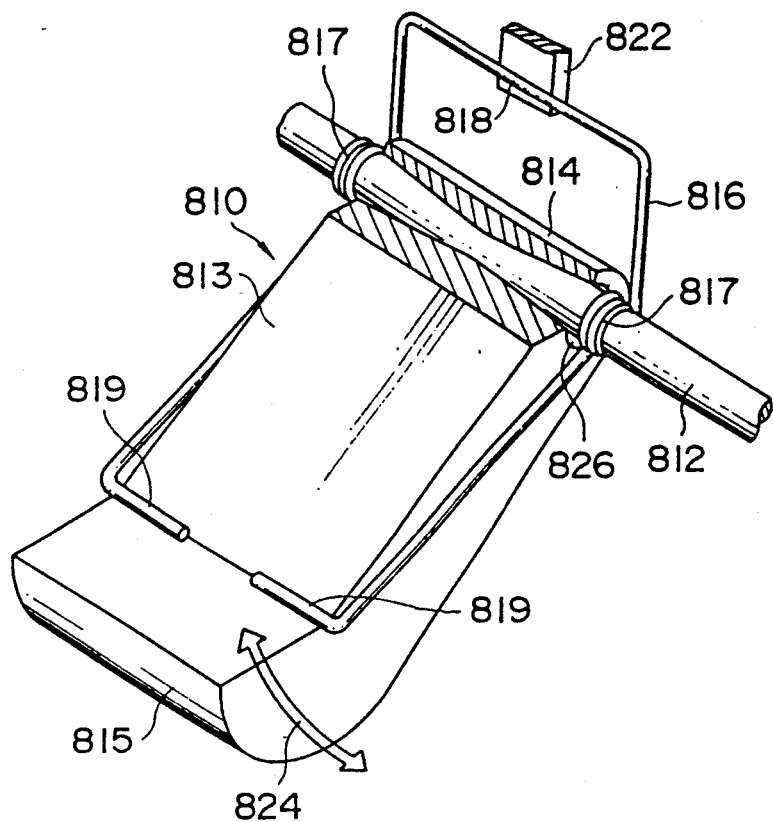
FIG. 25 is a perspective view for explaining the arrangement of the thermal head shown in FIG. 23.

As shown in FIG. 24, when a card 20 is being transported on a printing line (a line along which the card 20 is transported) in the printer of apparatus 10 by a roller 806, thermal heads 810 are pressed against the card 20 with a thermal ribbon 804 located therebetween. A thermal ribbon supply device (not shown), provided over the printing line, is controlled so that the card 20 and the thermal ribbon 804 are transported or fed in synchronism.

Figure 23:
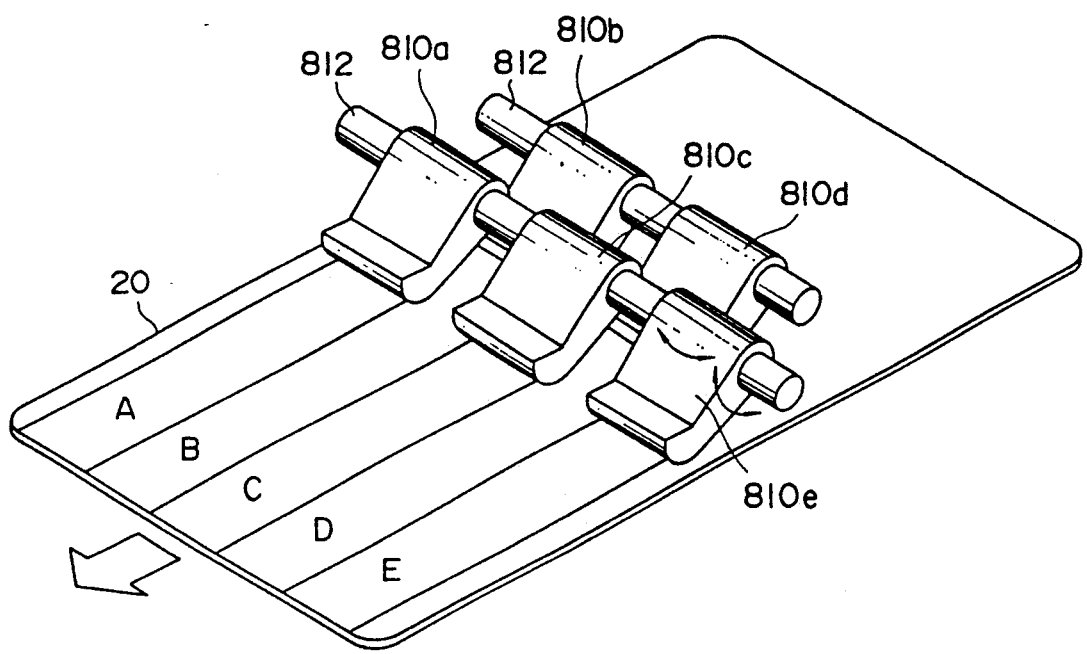
FIG. 23 is a perspective view showing the arrangement of the thermal head of the embodiment according to claim 12 of the present invention.

As shown in FIG. 23, five thermal heads 810a–810e of substantially the same configuration are arranged on the side to be printed (the upper surface) of the card 20. These heads 810a–810e are supported on two juxtaposed support shafts 812, which are arranged orthogonal to the printing line, forming an array of three heads and another array of two heads. Specifically, the heads 810a, 810c and 810e of the three-head array are mounted on one support shaft 812 at predetermined intervals relative to one another while each of the heads 810b and 810d of the two-head array is positioned between the heads 810a, 810c and 810e of the three-head array in the printing line. The three-head array is arranged downstream of the two- head array; as the card 20 is transported, printing is effected first by the heads 810b and 810d on regions B and D, and then by the heads 810a, 810c and 810e on regions A, C and E.

Next, the thermal head will be described in detail with reference to FIGS. 23-26.

The body 813 of the thermal head 810 has a rounded lower end for pressing against the card 20, and is inclined at a predetermined angle from the support shaft 812 to the upper surface of the card 20. Specifically, the head body 813 has its upper end section 814 supported by the support shaft 812 on the upstream side while its lower end section 815 pressed by urging means against the printing surface of the card 20 on the downstream side. In this lower end section, exothermic elements (not shown) are embedded. The lower end section 815 has a large number of exothermic elements arranged along a straight line and, when electrically energized through the electrodes in accordance with an imaging signal, will emit heat at dot-shaped regions thereof.

As the urging means, e.g. a spring 816, is used which comprises a coil whose opposite ends are extended and bent into a rectangular form. Specifically, the spring 816 comprises a pair of coil sections 817 wound around the support shaft 812 such as to embrace the body 813, a tail section 818 abutting against a stopper 822, and a pair of arm sections 819 pressing the lower end section 815 of the body 813 toward the printing line. Thus, the head body 813 can be swung about the support shaft 812 (in the directions of arrow 824) while being urged toward the printing line.

Figure 26:
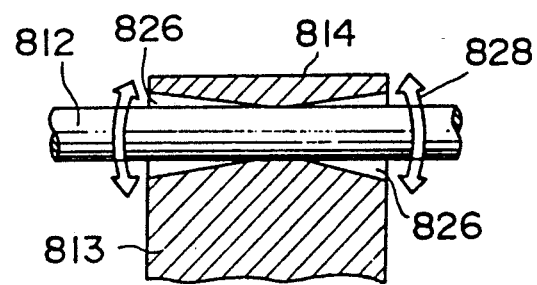
FIG. 26 is an illustration showing the rocking mechanism of the thermal head of FIG. 23.

As shown in FIG. 26, the hole 826 of the head body 813 for mounting on the support shaft 812 has a tapered configuration; specifically, it is broad at both ends and tapers in the longitudinal direction toward the narrowed center. For this reason, the head body 813 is supported such that it is partially slidable at its center on the support shaft 812 and is capable of swinging in directions (the direction of arrows 828) of inclination relative to the support shaft 812.

Next, the operation of this embodiment will be described.

The card 20 is e.g. an ID card, about 0.8 millimeters thick, of vinyl chloride, the area of its printing surface will be determined according to a standard. The ribbon 804 is fed toward the printing surface of the card 20 as the card 20, with its printing surface directed upward, is transported in the longitudinal direction. Upon the arrival of the card 20 at the first head array, the regions B and D are printed and, subsequently, the regions A, C and E are printed by the second head array. Meanwhile, because of the arms 819 of the spring 816 provided symmetrically on opposite sides, the head body 813 receives balanced left- and right-hand side urging forces so that, even if the head body 813 should be inclined relative to the support shaft 812, the position of the head body 813 can be immediately restored by the spring forces.

In the above-described embodiment, the exothermic elements of the head body can be securely applied to the card's printing surface so that printing can be well effected over the full width of the printing surface, because the head body 813 can swing not only in the printing line but also in a direction perpendicular to the printing line. For this reason, it has been made possible to greatly reduce the proportion defective of the card printing.

Although a coil spring is used as the urging means in the above embodiment, the invention is not limited to this. Compression coil springs, tension springs, and plate-shaped springs may also be used. The head body has a form like a snow sleigh in the above embodiment but, naturally, it is not limited to such a form.

Figure 27:
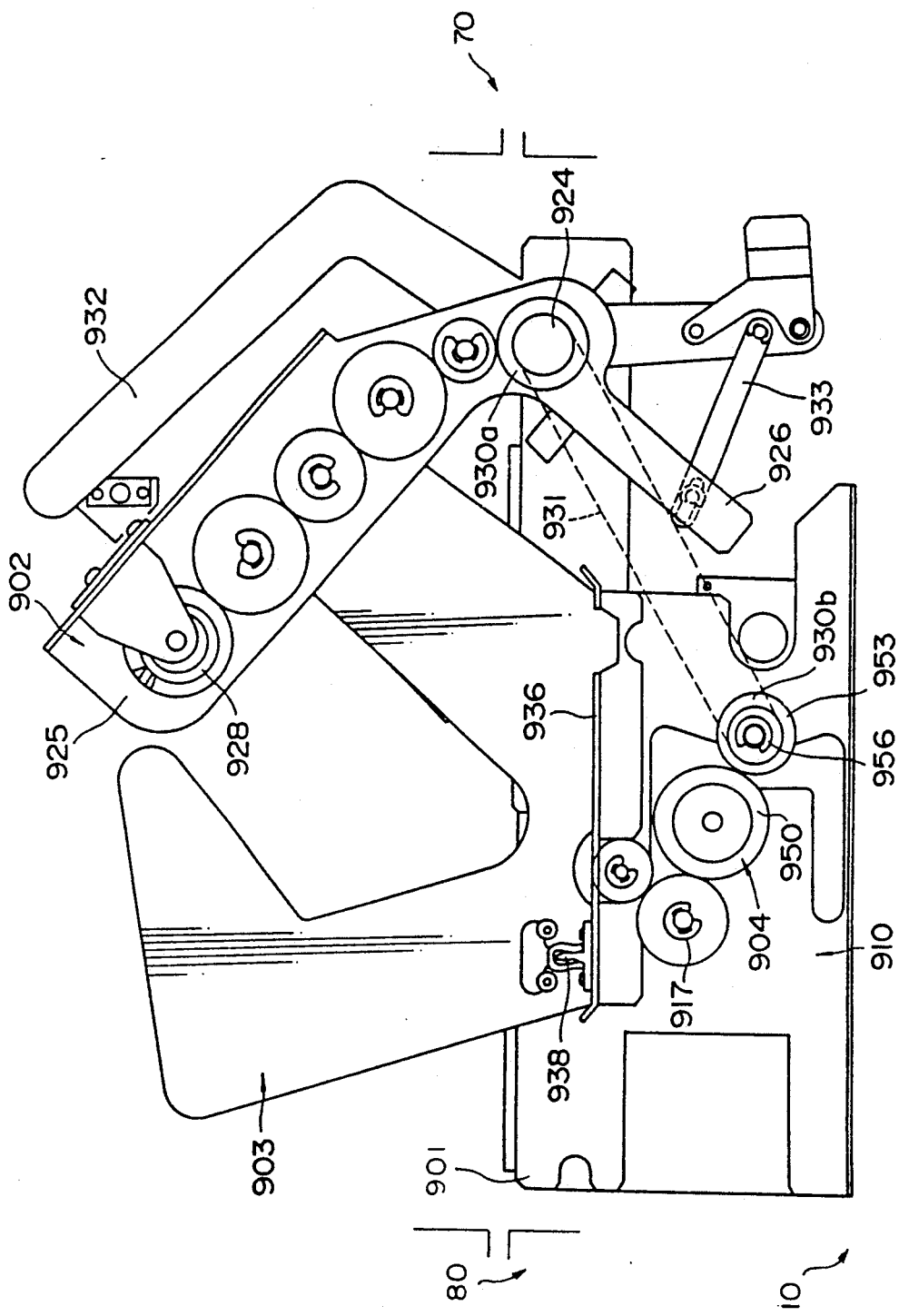
FIG. 27 is an illustration showing the overcoating mechanism of the embodiment according to claim 14 of the present invention.

FIG. 27 shows the arrangement of a coating device 900 provided between the printer and the stacker of the card producing apparatus 10 which comprises a card transporting section 901, a thermal ribbon supply and take-up section 903, a heating section 902, and a drive section 904. Coating device 900 will overcoat the print information by transfer, thereby protecting the print information, which information has been recorded by the printer.

The thermal ribbon supply and take-up section 903 is removably mounted on the card transporting section 901. The heating section 902 is pivoted in a pivoting groove 918 in the card transporting section 901 by means of a fulcrum shaft 924. The drive section 904 is fixed under the card transporting section 901, and transmits a driving power to the card transporting section 901, the thermal ribbon supply and take-up section 903 and the heating section 902 through driving power transmitting means such as gears or belts.

Figure 28:
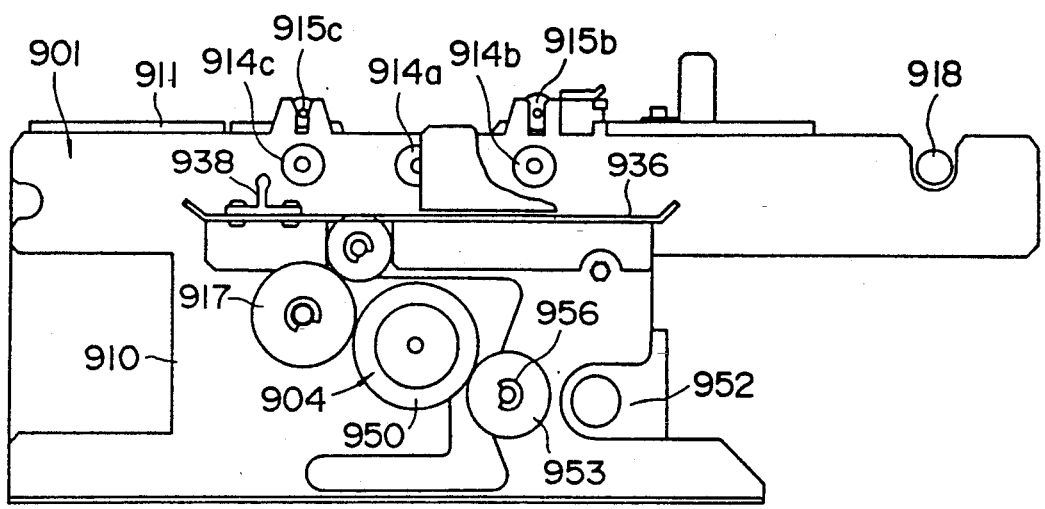
FIG. 28 represents front and plan views of the card transporting section of the overcoating mechanism of FIG. 27.

FIG. 28 shows the arrangement of the card transporting section 901 which comprises a support plate 910, a transport mount 911, and a guide 912 provided on either side of the transport mount 911. These guides 912 serve to guide the card in a predetermined direction. The transport mount 911 has transport-roller projecting openings 913a, 913b and 913c formed therein. From the transport-roller projecting openings 913a, 913b and 913c, an upper portion of transport rollers 914a, 914b and 914c, respectively, project slightly above the transport mount 911. The transport roller 914a is provided in a position immediately beneath a heat roller 922 of the heating section 902 when the heating section 902 is in a rotated position adjacent to the transport mount 911. The transport roller 914b is provided in a position away from the heat roller 922 toward a card insertion position when the heating section 902 is in the rotated position adjacent to the transport mount 911. The transport roller 914c is provided in a position away from the heat roller 922 toward a card outlet position when the heating section 902 is in the rotated position adjacent to the transport mount 911. The transport rollers 914a, 914b and 914c receive a driving power from a drive motor not shown, through a plurality of gears 917 which are rotatably arranged laterally of the support plate 910. Over the transport rollers 914b and 914c, rollers 915b and 915c are rotatably arranged such that an introduced card is held between the transport rollers 914b and 914c and the rollers 915b and 915c with a rather strong force, whereby it can be smoothly transported. Two sensors 916a and 916b are arranged in the card transporting direction on the transport mount at the card insertion position. Upon detection by these sensors 916a and 916b of the insertion of a card, the transport rollers 914a, 914b and 914c and the rollers 915a, 915b and 915c begin to rotate. Further, a sensor 916c is provided over the transport rollers 914b, which sensor 916c detects whether or not a coated portion is present on a thermal ribbon 947, or whether or not damages are present thereon. At the end of the transport mount 911 on the card insertion side, the pivoting groove 918 is provided, in which the heating section 902 is rotatably mounted by the shaft 924.

The support plate 910 has a plurality of legs 919 for supporting the transport mount 911. Laterally of the support plate 910, a thermal ribbon take-up and supply supporting section 936 is provided. On the thermal ribbon take-up and supply supporting section 936, a catching hole 937 and a projection 938 are provided; the thermal ribbon take-up and supply section 903 can be fixed at a predetermined position by engaging the projection 938 in the catching hole 937. Laterally of the transport mount 911, the guides 912 are provided which project somewhat above the transport mount 911 for guiding the card in the predetermined direction.

Figure 29:
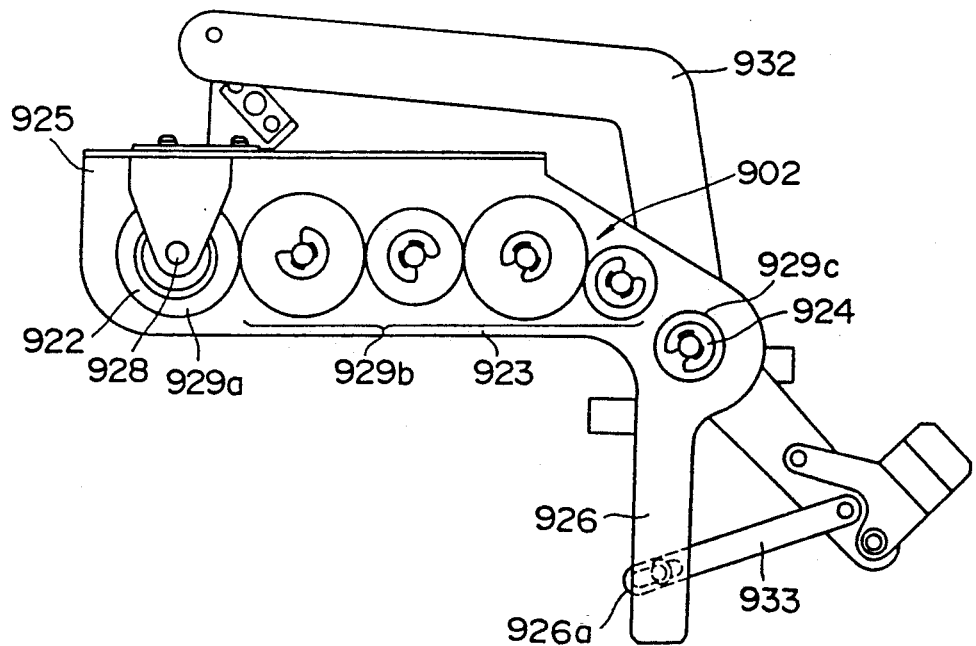
FIG. 29 represents front and plan views of the heating section of FIG. 27.
Figure 28:
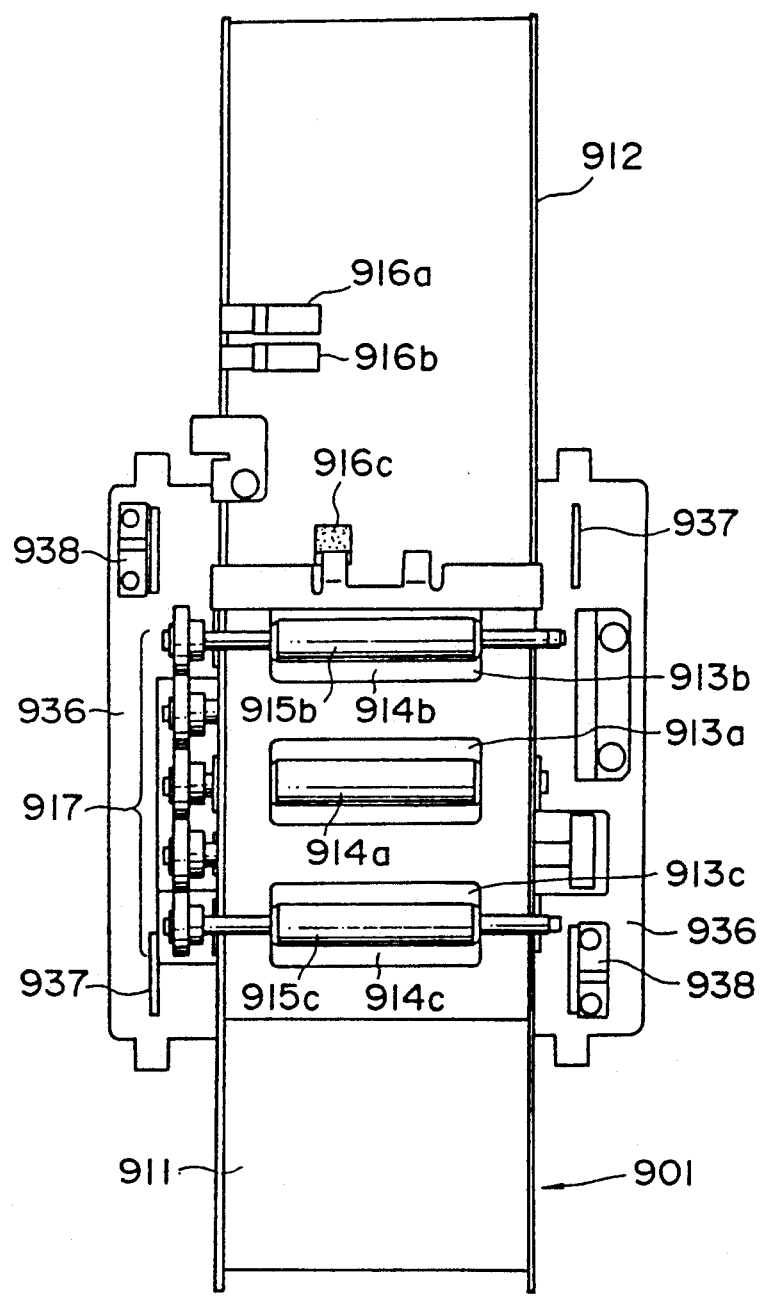
Figure 29:
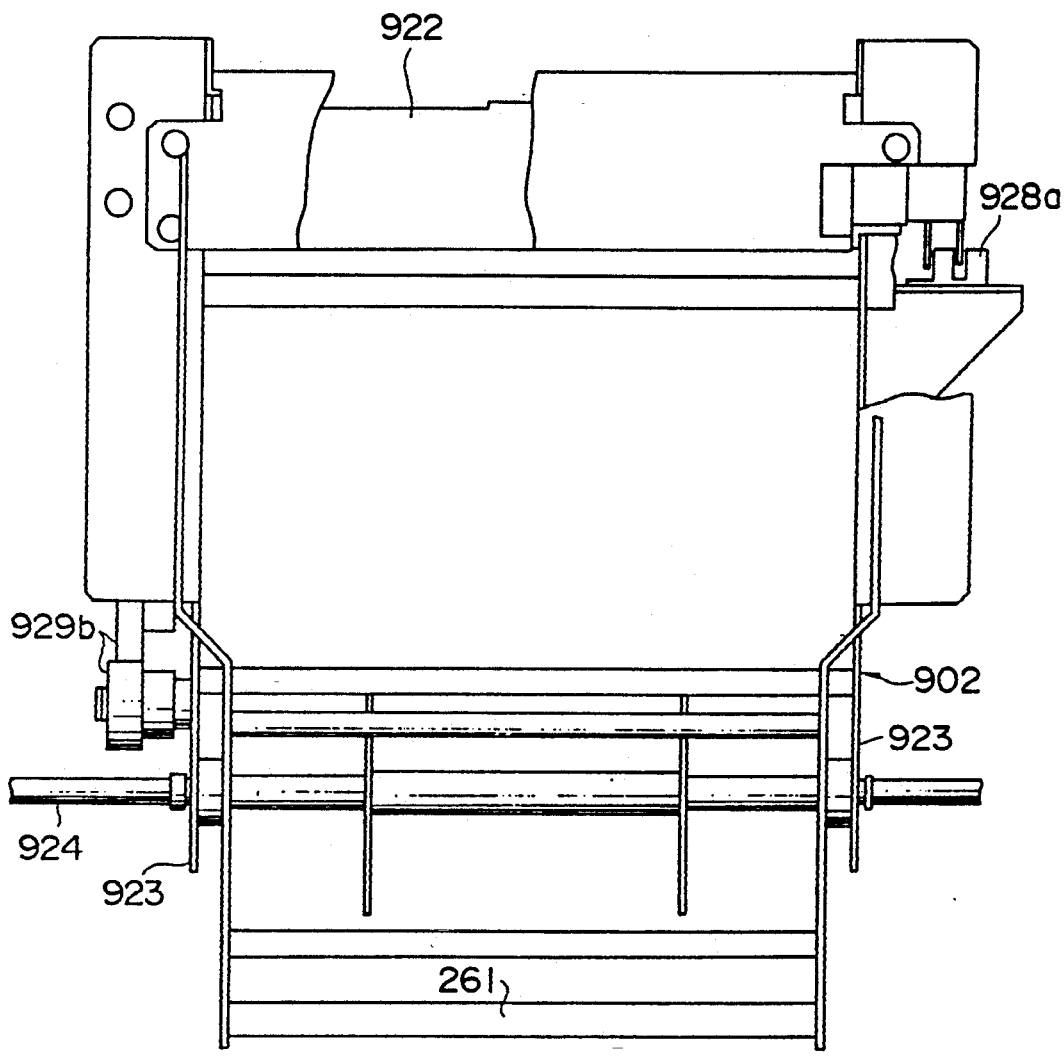

FIG. 29 shows the arrangement of the heating section 902 which comprises two parallel, elbow-shaped arms 923. A fulcrum shaft 924 is provided at the central portions of the arms 923. The heat roller 922 is provided at the forward end of a rectangular section 925, positioned above the fulcrum shaft 924, of the arms 923. A lower section fixing shaft 9261 and a connecting member 933 are provided at a rectangular section 926, positioned below the fulcrum shaft 924, of the arms 923, whereby the heating section body 902 is formed. The heat roller 922 is mounted on a heat roller supporting shaft 928. A gear 929a is provided on this heat roller supporting shaft 928 externally of the arms 923; a plurality of rotatable gears 929b is provided on the rectangular section 925 of the arms 923; a gear 929c is provided on the fulcrum shaft 924 externally of the arms 923. The gear 929a receives a driving power transmitted through the plurality of gears 929b from the gear 929c. On the fulcrum shaft 924, a pulley 930a is provided parallel to the gear 929c. A belt 931 is passed over the pulley 930a, which belt 931 is also passed over another pulley 930b which receives a rotating force through gears from a drive motor 950. The heating section 902 is held in the pivoting groove 918 of the card transporting section 901 via the fulcrum shaft 924.

Figure 31:
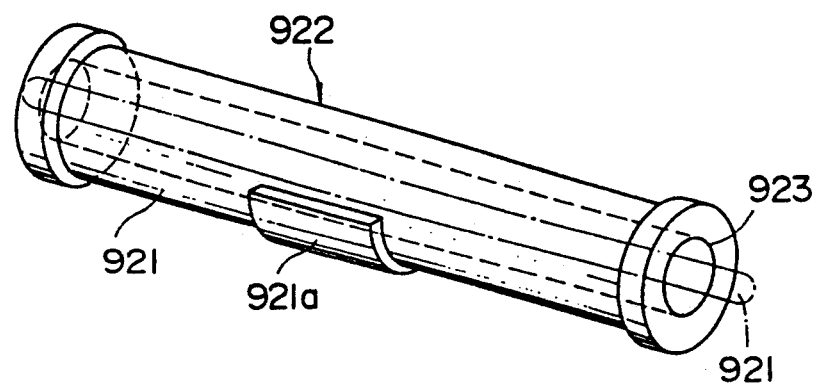
FIG. 31 is a perspective view of the heat roller of FIG. 27.

FIG. 31 shows the heat roller 922 which comprises a cylindrical roller body 921, with a projecting section being provided substantially at the center of the side wall of the roller body 921, the projecting section having substantially the same width as the object to be subjected to the transfer. Such projecting section is the heating transfer section, 921a; a cavity 923 is provided in the roller body 921 at the center of the length thereof. Within the cavity 923, an infrared radiation heater (quartz heater) is provided. The infrared radiation heater 224 is supported in such a manner that it does not touch the roller body 221. The heat roller 922 is formed of stainless steel having a good thermal conductivity.

Two sensors 928a and 928b are provided on the heat roller supporting shaft 928 which is provided at a position opposite to the gerar 929a. These two sensors 928a and 928b are for determining the rotation of a thermal ribbon take-up roll associated with the rotation of the heat roller 922, and the stand-by position of the heating transfer section 921a of the heat roller 922.

The lower end of the rectangular section 926 is in contact with a contact pin of a disk attached to the rotary shaft of an arm driving motor not shown, whereby the lower end of the rectangular section 926 will move upward and downward as the arm driving motor rotates. Two sensors, which sense the angle of rotation of the arm driving motor, are provided on the disk.

To the fulcrum shaft 924, a heater cover supporting member 921 is pivoted together with the heating section body 920. On the heater cover supporting member 921, two parallel arms 932 are arranged for rotation about the fulcrum shaft 923. During the transfer, the lower ends of the arms 932 are locked by a link mechanism (not shown) fixed to the body base.

Figure 32:
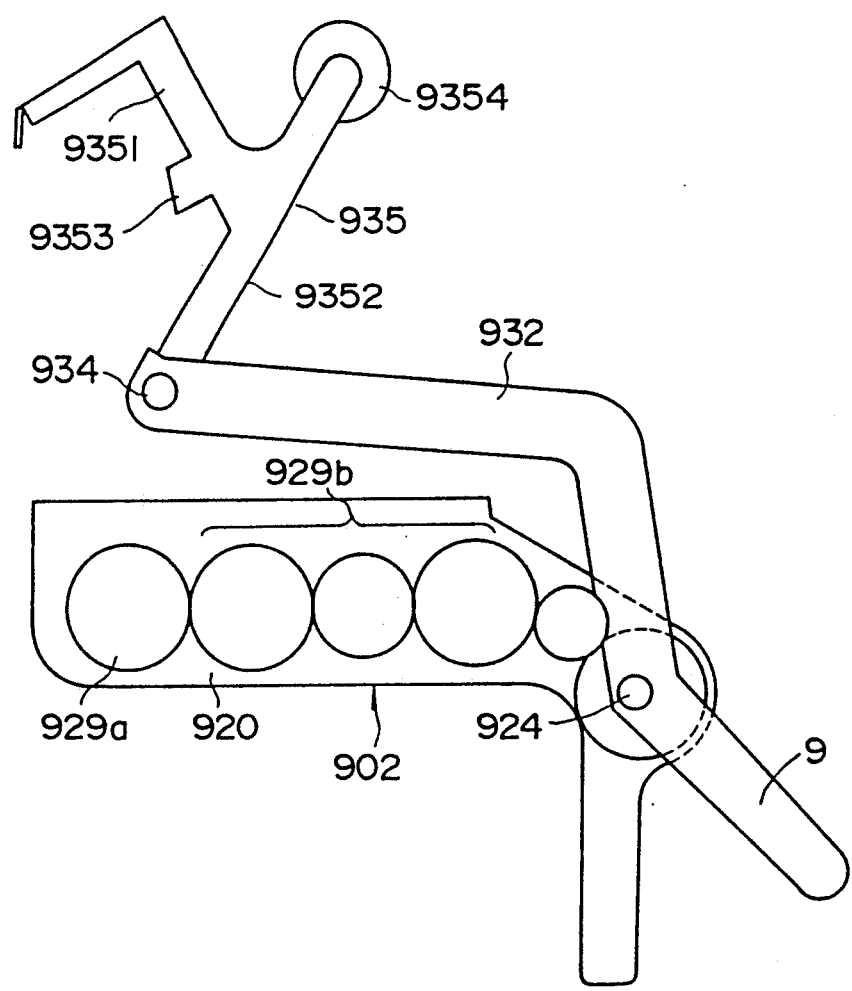
FIG. 32 is an illustration of the cover member which covers the heat roller of FIG. 27.

A heater cover 935 is pivoted to the upper ends of the heater cover supporting arms 932 via the fulcrum shaft 934, as shown in FIG. 32. The heater cover 935 covers the whole of the heater roller 922 in order to prevent the heat roller 922 at a high temperature from being touched by hand during an exchange of the thermal ribbon, or maintainance of the transfer device. The heater cover 935 has two parallel side frames 9351 having a right-angled forward end, with a cover plate 9352 being provided between these side frames 9351. One end of each side frame 9351 is pivoted to the upper ends of the arms 932 by means of the fulcrum shaft 934. The other end of each side frame 9351 is somewhat bent inward so that it can serve as a full covering when the heater cover 935 has been closed. A spring, not shown, is provided on the fulcrum shaft 934. When the heating section 902 is raised, the urging force of this spring and the weight of the heater cover 935 will produce an angular moment about the fulcrum shaft 934 of the heater cover 935 so as to close the heater cover 935. The side frames 9351 are provided with a projection 9353 so that the heater cover 935 cannot directly touch the heat roller 922 when the heater cover 935 is closed. The side frames 9351 are provided with a handle 9354.

Figure 30:
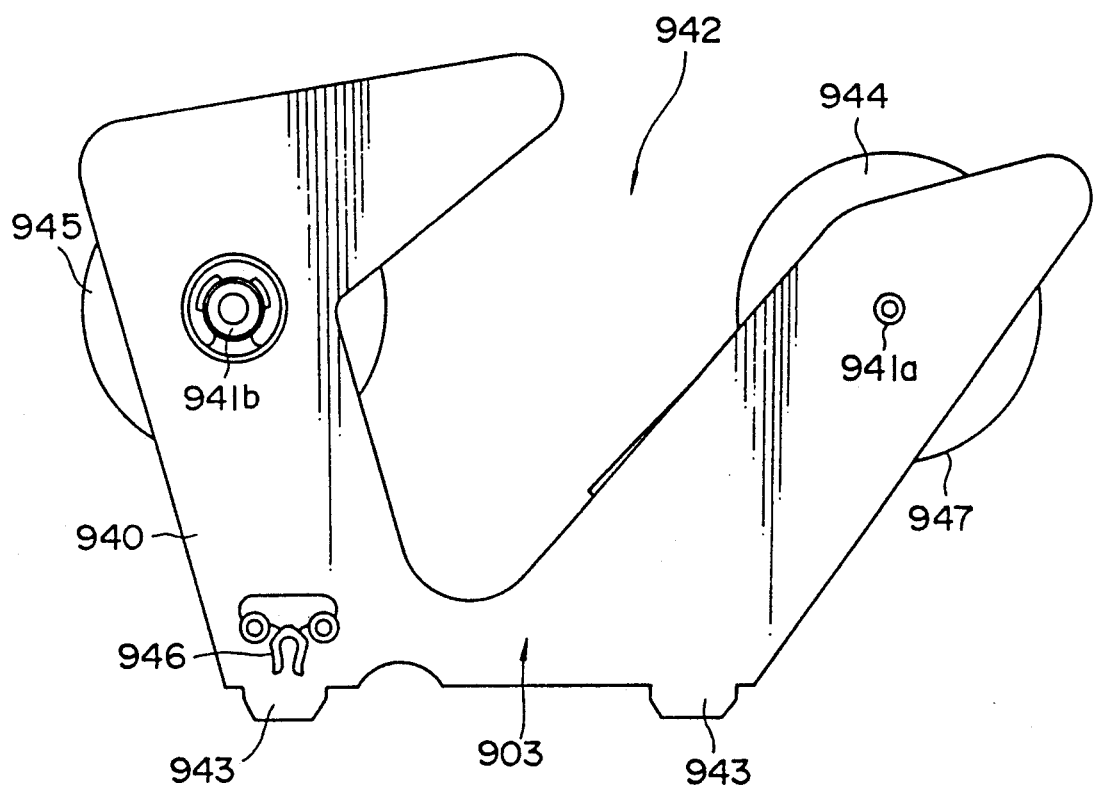
FIG. 30 represents front and plan views of the thermal ribbon winding/feeding section of the card transporting mechanism of FIG. 27.
Figure 30:
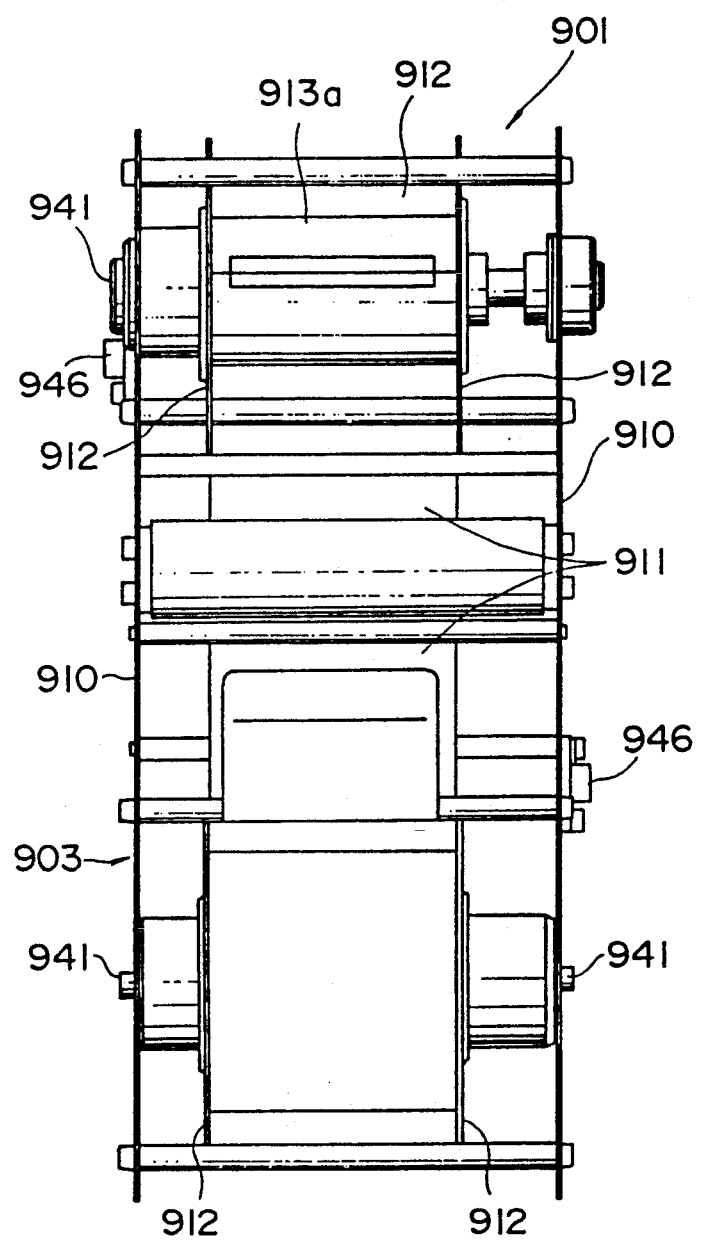

Next, the thermal ribbon take-up and supply section 903 will be described. FIG. 30 shows the arrangement of the thermal ribbon take-up and supply section 903, which comprises a pair of side plates 940 having a substantially U-shaped heat-roller transfer groove 942 formed at the center. The side plates 940 have a catching member 943 which fits into the catching hole 937 in the card transport section 901. The side plates 940 have bearing holes 941a and 941b, respectively, formed therein. A thermal ribbon supply roll 944 is rotatably mounted in one bearing roll 941a while a thermal ribbon take-up roll 945 is mounted in the other bearing hole 941b. The side plates 940 have a clamp member 946 which engages with the projection 938 of the card transport section 901 when the thermal ribbon take-up and supply section 903 is mounted on the card transport section 901. The thermal ribbon take-up roll 945 is provided with a gear 947 which meshes with a drive motor 951 through a group of gears 948.

The drive section 901 comprises transport rollers 914a, 914b and 914c, and the drive motor 950, as shown in FIGS. 27 and 28. The drive motor 950 is arranged under the support plate 910 of the card transport section 901. The driving power from the drive motor 950 is transmitted through a clutch 953, which is provided on the pulley 930b, and through gears acting as a driving power transmitting means. The belt 931, passing over the pulley 930b, also passes over the pulley 930a. The pulleys 930a and 930b and the belt 931 constitute the driving power transmitting means. A brake 956, which is associated with the clutch 953, will prevent displacement of the heat roller 922 when the clutch 953 is opened.

The drive motor 950 will also transmit power to the transport rollers 914a, 914b and 914c through the plurality of gears 917 provided on the support plate 910 as driving power transmitting means. Thus, the motor used for driving the heat roller 922 is the same as the drive motor used for driving the transport rollers 914a, 914b and 914c, and they will readily rotate in a synchronized manner. The thermal ribbon supply and take-up section 903 is driven by a take-up drive motor (not shown).

Next, the operation of the card producing apparatus according to the present embodiment will be described.

First, a card to which a transfer operation is to be effected is mounted on the transport mount before the sensor 916a. Then, the card is slid in the direction of transport and, immediately after the card's trailing edge has passed under the sensors 916a and 916b, the transport rollers 914a, 914b and 914c, the heat roller 922 and the thermal ribbon supply and take-up rollers 944 and 945 begin to rotate. When the card's leading edge has meshed with the transport roller 914b, the card is pulled in the direction toward the heat roller 922 and the transfer is effected. At that time, rotation of the transportrollers 914a, 914b and 914c is synchronized with rotation of the heat roller 922. After completion of the transfer to the card, the card is advanced and removed.

The principle on which the transport rollers 914a, 914b and 914c and the heat roller 922 are rotated based on the sensors 916a, 916b and 916c will now be described.

Figure 33:
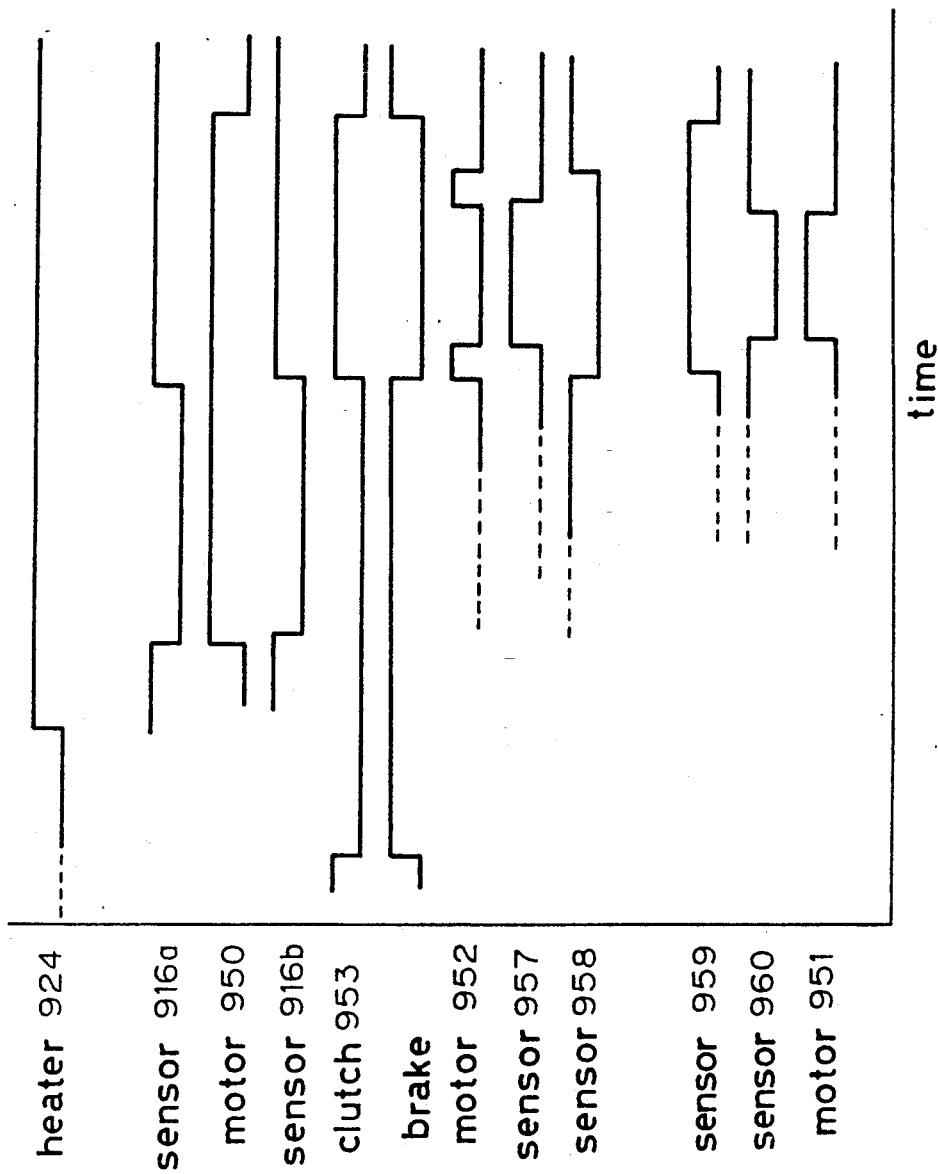
FIG. 33 is a timing chart of the overcoating mechanism of FIG. 27.

FIG. 33 is a timing chart for explaining the operation. Upon detection by the sensor 916a of the card, the drive motor 950 is rotated and simultaneously the transport rollers 914a, 914b and 914c are rotated. The clutch 953 is then maintained in its open position while the brake 956 operates. The heat roller 922 is thus fixed. When the card has been pinched between the transport roller 914b and the roller 915b after a further advance, the card is automatically transported. When the card has passed the sensor 916b, the clutch is released from the open position and the brake is disengaged and the heat roller 922 will begin to rotate. The drive motor 52 for vertically moving the arms will rotate through 45 degrees to lower the arms 923 of the heating section 902. As the portion of the card subject to the transfer passes over the transport roller 914a, the arms 923 of the heating section 902 will rotate through 45 degrees and the sensor 57 will transmit a lower-limit signal to stop the motor 52. Then, the signal from the sensor 57 is also transmitted to the motor 51, whereby the motor 51 begins to rotate to make the thermal ribbon take-up roller 45 take up the thermal ribbon. After completion of the transfer by the heating and transferring section 222, the signal from the sensor 57 terminates so that the motor 51 stops rotating and the motor 52 for vertically moving the arms will rotate in the reverse direction. The heating section 902 is thereby raised. When the heating section 902 has been raised to a 45-degree position, the sensor 58 senses this and will generate an upper-limit signal to stop the motor 52. Then, the heat roller 922 will continue to rotate, and the sensor will detect the arrival of the heating and transferring section 222 at the stand-by position; the detection signal from the sensor release the clutch 53, and the brake will operate to fix the heating and transferring section 222.

Next, the supply of a new thermal ribbon in case of a shortage of the thermal ribbon during the transfer operation will be described.

First, the heating section 902 is raised. Thereby, the heater cover 935 is closed by the urging force of the spring and the weight of the heater cover 935. The thermal ribbon supply and take-up section 903 is then removed from the card transporting section 901, and the used up thermal ribbon supply and take-up rollers, 44 and 45, respectively, are removed from the side plates 940, and new thermal ribbon take-up and supply rolls, 45 and 44, respectively, are mounted for completing the exchange.

Figure 34:
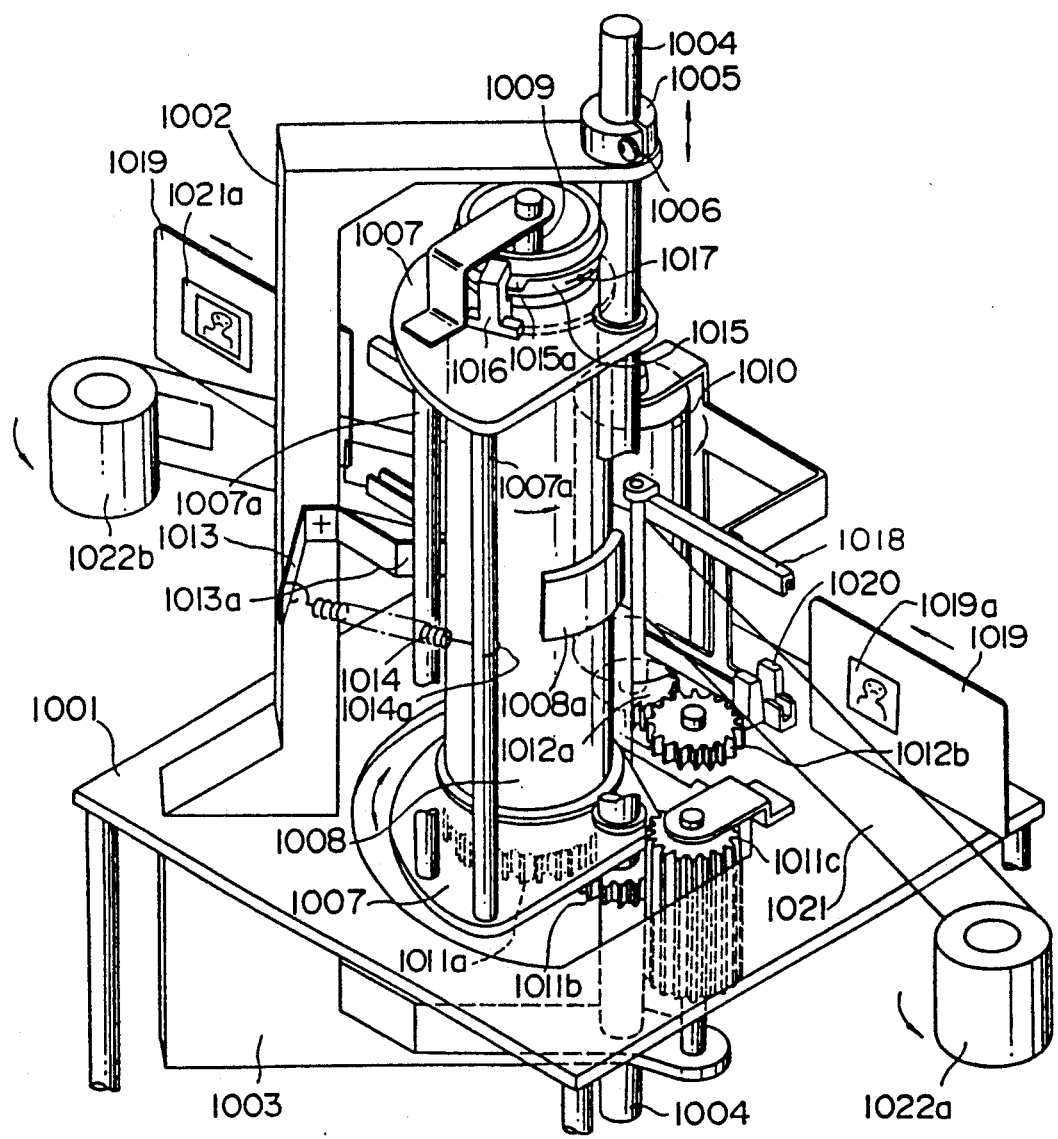
FIG. 34 is a perspective view showing the arrangement of the printer of the embodiment according to claim 15 of the present invention.

FIG. 34 is a perspective view of the another embodiment of an overcoating device of the card producing apparatus. A fixed base mount 1000 has support posts 1002 and 1003 vertically arranged on its upper and lower surfaces. The base mount 1000 and the support posts 1002 and 1003 constitute the base of the transferring device.

Between the support posts 1002 and 1003, a support shaft 1004 is mounted. A ring 1005 for clamping and holding the support shaft 1004 is provided on an end of the support post 1002. The clamping action of the ring 1005 can be loosened by loosening a screw 1006, whereby the support shaft 1004 becomes movable axially.

A pair of upper and lower support members 1007, which is swingable about the support shaft 1004, is mounted to the support shaft 1004. The support members 1007 are connected together by a connecting shaft 1007a to form a single body.

A cylindrical heat roller 1008 is mounted on the support members 1007 in a parallel relation to the support shaft 1004. The heat roller 1008 is rotatable about its own axis. On the outer surface of the heat roller 1008, a projecting section 1008a, the upper surface of which forms part of the circumferential wall of the cylinder, is provided. The projecting section 1008a has a curved form as the heat roller 1008 does. An infrared radiation heater 1009 is coaxially housed in the heat roller 1008. Under the control of a temperature sensor or a temperature regulator, not shown, the infrared radiation heater 1009 and the heat roller 1008 are heated to a constant temperature.

A platen roller 1010 is provided opposite to the heat roller 1008 on the base mount 1000. The platen roller 1010 is parallel to the heat roller 1008 and is rotatable about its own axis.

A gear 1011a is coaxially mounted on the lower end of the heat roller 1008. A gear 1011b meshing with this gear 1011a is rotatably mounted on the support shaft 1004. A gear 1011c meshing with the gear 1011b is rotatably mounted between the base mount 1000 and the support post 1003. Meanwhile, a gear 1012a is coaxially mounted on the lower end of the platen roller 1010. A gear 1012b meshing with this gear 1012a is rotatably mounted to the base mount 1000. The gears 1011c and 1012b are interconnected together through an electromagnetic clutch or brake, not shown, and are further connected to a drive motor, not shown. Thus, the heat roller 1008 and the platen roller 1010 are synchronously rotated by the actuation of this drive motor in opposite directions, as shown by arrows in the figure, and their rotation is controlled by the electromagnetic clutch and the brake.

Here, the gears 1011b and 11c are spur gears; the gear 1011c is elongated in the axial direction. Thus, the engagement between the gears 1011b and 10f1c is ensured even if the support shaft 1004 and the heat roller 1008 are moved along their axis. A stopper member 1013 is attached to the support post 1002. Between this stopper member 1013 and the connecting shaft 1007a, a coil spring 1014 is interposed which has a spring force in the direction of compression. Thus, the support member 1007 is urged for swinging about the axis of the support shaft 1004 by the spring 1014 acting as urging means while the heat roller 1008 is urged for pressing against the platen roller 1010. The arrangement is such that one end 1013a of the stopper member 1013 presses against the connecting shaft 1007a so as to restrain the support member 1007 from swinging such that a small clearance is present between the heat roller 1008 and the platen roller 1010.

Further, one end 1014a of the coil spring 1014 is slidably engaged with the connecting shaft 1007a for restraining the movement of the support member 1007 in the axial direction of the heat roller 1008.

A control ring 1015 is attached to the upper end of the heat roller 1008 so as to rotate with the heat roller 1008. The termination-of-rotation position of the heat roller 1008 (termination-of-rotation position of the projecting section 1008a) is controlled by the detection of a projection 1015a of the ring 1015 by means of a sensor 1016 provided on the supportmember 1007. This ring 1015 is fixed to the heat roller 1008 by a screw 1017. By loosening the screw 1017, the relative position of the projection 1015a and the projecting section 1008a can be changed.

On the base mount 1000, guide rails 1018 are provided as card transporting means. Along the guide rails 1018, a card 1019 is transported to a transfer position between the rollers 1008 and 1010. A sensor 1020 is provided at the forward end of one guide rail 1018. This sensor 1020 detects the card 1019 for controlling the initiation-of-rotation position of the heat roller 1009.

A thermal ribbon 1021 for coating is interposed between the rollers 1008 and 1010. This thermal ribbon 1021 is intermittently advanced for each coating operation between rewind and take-up rollers 1022a and 1022b provided with a torque limiting mechanism. The arrangement is such that a constant spacing is normally present between the thermal ribbon 1021 and the heat roller 1008 so that a coating layer of the thermal ribbon 1021 is prevented from being liberated uselessly by radiantheat from the heat roller 1008.

Next, the operation of the card coating device of this embodiment will be described.

First, the card 1019, which is to be subjected to the coating, is inserted into the guide rails, where the sensor 1020 detects the card 1019 to cause the heat roller 1008 and the platen roller 1010 to begin to rotate by the drive motor. The card 1019 is transported while being pinched between the rollers 1008 and 1010 and, at the projecting section 1008a, the thermal ribbon 1021 is pressed against a print section 1019a of the card 1019. As a result, the coating layer 1021a of the thermal ribbon 1021 is liberated and transferred to coat the print section 1019a.

The transfer position may be changed in the transport direction of the card 1019 (the longitudinal direction of the card) by loosening the screw 1017 to change the position of the projecting section 1015a relative to the sensor 1016 to change the relation between rotation of the heat roller 1008 and advance of the card 1019, thereby to shift, in the longitudinal direction of the card 1019, the position where the projection section 1008a presses against the card 1019.

Next, the transfer position may also be changed widthwise of the card 1019 by loosening the screw 1006 to shift the mountingposition of the support shaft 1004 upwardly or downwardly. That is, the heat roller 1008, which is supported by the support shaft 1004 through the support member 1007, is shifted upwardly or downwardly (axially) to shift, widthwise of the card 1019, the pressing position of the projecting section 1008a against the card 1019. In this way, the transfer position may be changed widthwise of the card 1019 without requiring exchange of the heat roller 1008.

The above embodiment includes a vertical-type card producingapparatus having a vertically mounted heat roller 1008. The invention, however, is also applicable to an arrangement in which the heat roller 1008 is mounted horizontally. The urging means, though shown in the form of a coil spring 1014, may be constituted by other known means such as elastic rubber.

We claim:

1. A card producing apparatus comprising:
   a feeder capable of containing a plurality of stacked cards for recording magnetic data and print data thereon, and allowing a predetermined number of cards to be removed from it;
   data writing means for writing magnetic data onto a card of said plurality of stacked cards;
   said data writing means having first transport means for transporting said card in a predetermined direction therethrough;
   a printer for writing print data on a predetermined portion of said card;
   said printer having a holding stage for said card located on a sliding mechanism, a thermal ribbon feeding and take up mechanism, thermal heads and second transport means for transporting said card;
   a coating device having heating means for forming a cover layer over a printed surface of said card;
   a stacker, having third transport means for said card from said printer into said stacker for storing a predetermined number of said plurality of stacked cards therein;
   first detecting means for detecting whether said card is present within said data writing means and when no said card is present within said data writing means, providing a card transporting command signal to introduce said card to said data writing means;
   second detecting means for detecting whether said card is present within said printer and when no said card is present within said printer, providing a card transporting command signal to introduce said card from said data writing means into said printer; and third detecting means for detecting a completion of printing by said printer so that said card transported out of said printer is stored in said stacker;

wherein said second transport means of said printer includes a reciprocating stage between a card inlet position and a card outlet position, said stage having a support surface for receiving, at said card inlet position, said card which slides thereon; a catching groove provided at said card inlet end of said stage, said catching groove being arranged to project above said support surface for supporting a trailing edge of an introduced said card after introduction of said card, said catching groove being lowered after said stage has been placed in said card outlet position and said card has been removed; a projection member being provided on a portion of said stage where a leading edge of said card is to be located, said projection member being arranged to support said leading edge of said card when said card is brought onto said support surface, said projection member being lowered below said support surface when said stage has been placed in said card outlet position; a claw member together with a presser member located above said card inlet position of said stage, said claw member being for causing said trailing edge of said card to slide to a predetermined position on said support surface when said card is brought onto said support surface, said presser member being for pressing said trailing edge of said card on said support surface toward said card outlet position when said stage has been placed in said card outlet position; said thermal head for effecting transfer to a predetermined portion of said card via said thermal ribbon being located above said card outlet position of said stage.

2. A card producing apparatus as defined in claim 1, wherein said feeder includes pressing means for pressing said stacked cards in a direction of thickness of said plurality of stacked cards, and supporting means for supporting said stacked cards against a pressing force of said pressing means.

3. A card producing apparatus as defined in claim 1, wherein between said data writing means and said printer, a card reversing device is provided capable of transporting out said card in a predetermined direction from said data writing means; said first transport means has driving means for introducing said card returned from said card reversing device into said data writing means and thereafter again transporting a returned said card back to said reversing device; said data writing means having data reading means for reading data written in said card and checking means for checking the read data.

4. A card producing apparatus as defined in claim 1, wherein said apparatus comprises:
a cleaner having third transport means for transporting in a predetermined direction said card removed from said feeder for cleaning said card being transported;
fourth detecting means for detecting whether said card is present within said cleaner and when no said card is present within said cleaner, providing a card introducing command signal to transport said card from said feeder into said cleaner;
said cleaner includes a first sticky member which scrubs the surface of the card being transported from said feeder by removably adhering to and rolling on the surface of the card.

5. A card producing apparatus as defined in claim 4, wherein a second sticky member is provided which is in contact with said first sticky member and which has an adhesive strength stronger than said first sticky member so as to scrub away dust from said first sticky member.

6. A card producing apparatus as defined in claim 1, wherein said printer includes at least two guide bars arranged parallel to each other; at least one linear bush being slidably fitted onto each of said two guide bars; said at least one linear bush being united into one body by a linear bush casing; a slide stage being fixed to said linear bush casing for holding and fixing said card; a feed screw being arranged parallel to said guide bars and having two nuts screwed onto said feed screw; a first spring being interposed between said two nuts for urging them away from each other; a nut casing for receiving the axially outer sides of said two nuts of one set being arranged movable with said two nuts along said feed screw; said nut casing having arms formed thereon, which arms extend on both axial sides of said linear bush casing; a second spring being provided between said nut casing and said linear bush casing for continuously urging said linear bush casing against either one of said arms.

7. A card producing apparatus as defined in claim 1, wherein said thermal ribbon feeding and take up mechanism unwinds thermal ribbon from a coiled condition on a feed drum so as to feed said thermal ribbon, and takes up and winds said thermal ribbon after being used,
a presser member being provided in said thermal ribbon feeding and take up mechanism, which member has a friction surface having different frictional resistance values at different portions thereof said friction surface of said presser member being pressed against said thermal ribbon on said feed drum, a shifting mechanism being associated with at least either of said thermal ribbon or said presser member for shifting, depending on an amount of said thermal ribbon remaining on said feed drum, a contact point of said friction surface in being in contact with said thermal ribbon.

8. A card producing apparatus as defined in claim 1, wherein said printer includes a support shaft arranged orthogonal to a printing direction of a printing medium, said thermal heads each of which is supported swingably about an axis of said support shaft, urging means for pressing exothermic elements, which are provided on an end of each of said thermal heads, against said printing medium, and means for suitably causing said exothermic elements to emit heat in accordance with a picture signal, said exothermic elements on said thermal heads having a form which is narrower in width than the printing medium.

9. A card producing apparatus as defined in claim 8, said head bodies are partially slidable on said support shaft at their support portions, said head bodies being swingable in directions in which they become inclined relative to said support shaft.

10. A card producing apparatus as defined in claim 1, wherein between said printer and said stacker, there are provided:

fifth transport means for transporting said card to a predetermined position where transfer can be performed, a heating transfer section having a heat roller for effecting transfer of said thermal ribbon onto said card, and an arm supporting such heat roller and rotatably mounted on said fifth transport means, a thermal ribbon feeding and take-up mechanism for feeding said thermal ribbon to said heating transfer section and taking up said thermal ribbon after completion of the transfer, and a drive section for transmitting a driving power of a drive motor through driving power transmitting means to said fifth transporting means, to said heating transfer section, and to said thermal ribbon supply and take-up section.

11. A card producing apparatus as defined in claim 1, wherein between said printer and said stacker, there are provided:

transport rollers (914a, 914b, 914c) for transporting said card in a predetermined direction, a thermal ribbon being fed to the non-abutting side of the card, a support shaft (924) extending parallel to the transport rollers, a heat roller extending parallel to the support shaft and provided with a cylinder-wall-shaped projecting transfer abutment surface for abutting against said card via said thermal ribbon, said heat roller being movable toward and away from said transport rollers, the position of said heat roller being adjustable in the direction of extension of said support shaft, said heat roller being rotatable about an axis of rotation which is parallel to said support shaft, urging means for urging the heat roller toward said transport rollers, a stopper acting against the urging force of said urging means for limiting the angle of swing of said heat roller such that the transfer abutting surface of said heat roller can rotate while pressing said transport rollers via said thermal ribbon, and drive means for rotating said transport rollers and said heat roller in a syncronized manner.

* * * * *